(12) United States Patent
Cui

(10) Patent No.: US 12,522,651 B2
(45) Date of Patent: Jan. 13, 2026

(54) BCG CAR CONSTRUCTS AND METHODS OF THEIR MANUFACTURE AND USE

(71) Applicant: VERSITI BLOOD RESEARCH INSTITUTE FOUNDATION, INC., Milwaukee, WI (US)

(72) Inventor: Weiguo Cui, Brookfield, WI (US)

(73) Assignee: Versiti Blood Research Institute Foundation, Inc., Milwaukee, WI (US)

( * ) Notice: Subject to any disclaimer, the term of this patent is extended or adjusted under 35 U.S.C. 154(b) by 820 days.

(21) Appl. No.: 17/782,818

(22) PCT Filed: Dec. 8, 2020

(86) PCT No.: PCT/US2020/063775
§ 371 (c)(1),
(2) Date: Jun. 6, 2022

(87) PCT Pub. No.: WO2021/118997
PCT Pub. Date: Jun. 17, 2021

(65) Prior Publication Data
US 2023/0036135 A1   Feb. 2, 2023

Related U.S. Application Data

(60) Provisional application No. 62/945,406, filed on Dec. 9, 2019.

(51) Int. Cl.
| | | |
|---|---|---|
| C07K 16/12 | (2006.01) |
| A61K 39/07 | (2006.01) |
| A61K 40/11 | (2025.01) |
| A61K 40/31 | (2025.01) |
| A61K 40/45 | (2025.01) |
| A61P 13/10 | (2006.01) |
| A61P 31/10 | (2006.01) |
| A61P 35/00 | (2006.01) |
| C07K 14/70 | (2006.01) |
| C07K 14/705 | (2006.01) |
| C07K 14/725 | (2006.01) |

(52) U.S. Cl.
CPC .......... *C07K 16/1278* (2013.01); *A61K 39/07* (2013.01); *A61K 40/11* (2025.01); *A61K 40/31* (2025.01); *A61K 40/4524* (2025.01); *A61P 13/10* (2018.01); *A61P 35/00* (2018.01); *C07K 14/7051* (2013.01); *C07K 14/70578* (2013.01); *A61K 2239/31* (2023.05); *A61K 2239/38* (2023.05); *C07K 2317/622* (2013.01); *C07K 2319/02* (2013.01); *C07K 2319/03* (2013.01); *C07K 2319/33* (2013.01)

(58) Field of Classification Search
None
See application file for complete search history.

(56) References Cited

U.S. PATENT DOCUMENTS

| | | |
|---|---|---|
| 5,618,916 A | 4/1997 | Ratliff et al. |
| 2005/0089942 A1 | 4/2005 | Sack et al. |
| 2013/0287748 A1 | 10/2013 | June et al. |
| 2018/0334651 A1 | 11/2018 | Cui |

FOREIGN PATENT DOCUMENTS

| | | |
|---|---|---|
| WO | 2140099671 A1 | 6/2014 |
| WO | 2017112184 A1 | 6/2017 |
| WO | 2017/116212 A1 | 7/2017 |
| WO | 2019125034 A1 | 6/2019 |

OTHER PUBLICATIONS

Zhao et al., "Monoclonal antibodies against a *Mycobacterium tuberculosis* Ag85B-Hsp 16.3 fusion protein," Hybridoma, Oct. 18, 2011 (Oct. 18, 2011)., vol. 30, No. 5, pp. 427-432.
Ortega et al., "Selection of a Single Domain Antibody, Specioic for an HLA-Bond Epitope of the Mycobacterial Ag85B Antigen," Frontiers in Immunology, Oct. 2, 2020 (Oct. 2, 2020), vol. 11, pp. 1-10.
Search Report and Written Opinion in Connection With PCT/US2020/063775.
Altschul, et al. "Gapped BLAST and PSI-BLAST: a new generation of protein database search programs", Nucleic Acids Research, 1997, vol. 25, No. 17 3389-3402.
An et al. "Construction of a new anti-CD19 chimeric antigen receptor and the anti-leukemia function study of the transduced T cells", Oncotarget. Mar. 1, 2016; 7(9):10638-49.
Barnas, et al. "T Cells and Stromal Fibroblasts in Human Tumor Microenvironments Represent Potential Therapeutic Targets", Cancer Microenvironment (2010) 3:29-47.
Batzer, et al. "Enhanced evolutionar PCR using oligonucleotides with inosine at the 3'-terminus", Nucleic Acids Research, vol. 19, No. 18 5081.
Chen, et al. "MB49 Murine Urothelial Carcinoma: Molecular and Phenotypic Comparison to Human Cell Lines as a Model of the Direct Tumor Response to Bacillus Calmette-Guerin", The Journal of Urology, vol. 182, 2932-2937, Dec. 2009.
Curiel. "Tregs and rethinking cancer immunotherapy", J Clin Invest. 2007;117(5):1167-1174.
Eshhar, et al. "Specific activation and targeting of cytotoxic lymphocytes through chimeric single chains consisting of antibody-binding domains and the y or C subunits of the immunoglobulin and T-cell receptors", Proc. Natl. Acad. Sci. USA vol. 90, pp. 720-724, Jan. 1993 Immunology.

(Continued)

*Primary Examiner* — Oluwatosin A Ogunbiyi
(74) *Attorney, Agent, or Firm* — Quarles & Brady LLP

(57) ABSTRACT

Provided herein are antibodies and antigen binding fragments thereof specific to BCG antigen Ag85B as well as chimeric antigen receptors and lymphocytes comprising Ag85B antibodies as described and methods of treating cancer and tuberculosis infections using the CAR lymphocytes described. In a first aspect, provided herein is an isolated antibody or antigen binding fragment thereof capable of binding Bacillus Calmette-Guerin (BCG) antigen Ag85B.

20 Claims, 5 Drawing Sheets

Specification includes a Sequence Listing.

(56) References Cited

OTHER PUBLICATIONS

Ganss, R. and Hanahan, D. "Tumor Microenvironment Can Restrict the Effectiveness of Activated Antitumor Lymphocytes", Cancer Research 58, 4673-4681. Oct. 15, 1998.

Ganss, et al. "Combination of T-Cell Therapy and Trigger of Inflammation Induces Remodeling of the Vasculature and Tumor Eradication", Cancer Research 62, 1462-1470, Mar. 1, 2002.

Garbi, et al. "CpG Motifs as Proinflammatory Factors Render Autochthonous Tumors Permissive for Infiltration and Destruction", J Immunol 2004; 172:5861-5869.

Jin, et al. "Safe engineering of CAR T cells for adoptive cell therapy of cancer using long-term episomal gene transfer", EMBO Mol Med. Jul. 1, 2016;8(7):702-11.

Jones, et al. "Replacing the complementarity-determining regions in a human antibody with those from a mouse", Nature 321:522-525 (1986).

Kalia, et al. "Prolonged Interleukin-2Ra Expression on Virus-Specific CD8+ T Cells Favors Terminal-Effector Differentiation In Vivo", Immunity 32, 91-103, Jan. 29, 2010.

Karlin, S. and Altschul, S. "Methods for assessing the statistical significance of molecular sequence features by using general scoring schemes", Proc. Natl. Acad. Sci. USA vol. 87, pp. 2264-2268, Mar. 1990.

Ko, et al. "LRRTM2 Functions as a Neurexin Ligand in Promoting Excitatory Synapse Formation", Neuron 64, 791-798, Dec. 24, 2009.

Liang, et al. "β-Catenin mediates tumor-induced immunosuppression by inhibiting cross-priming of CD8(+) T cells", Leukoc Biol 95, 179-190 (2014).

Maus, et al. "Antibody-modified T cells: CARs take the front seat for hematologic malignancies", Blood, Apr. 24, 2014 x vol. 123, No. 17.

Mock et al. "Automated manufacturing of chimeric antigen receptor T cells for adoptive immunotherapy using CliniMACS prodigy", Cytotherapy. Aug. 2016; 18(8):1002-11.

Monjezi et al. "Enhanced CAR T-cell engineering using non-viral Sleeping Beauty transposition from minicircle vectors", Leukemia. Aug. 5, 2016.

Ohtsuka, et al. An Alternative Approach to Deoxyoligonucleotides as Hybridization Probes by Insertion of Deoxyinosine at Ambiguous Codon Positions, J. Biol. Chem. 260:2605-2608 (1985).

Oldham et al. "Lentiviral vectors in cancer immunotherapy", Immunotherapy. 2015; 7(3):271-84.

Park et al. "CD19-targeted CAR T-cell therapeutics for hematologic malignancies: interpreting clinical outcomes to date", Blood 127:3312-3320, 2016.

Pipkin, et al. "Interleukin-2 and Inflammation Induce Distinct Transcriptional Programs that Promote the Differentiation of Effector Cytolytic T Cells", Immunity 32, 79-90, Jan. 29, 2010.

Poehlein, et al. "Depletion of tumor-induced Treg prior to reconstitution rescues enhanced priming of tumor-specific, therapeutic effector T cells in lymphopenic hosts", Eur. J. Immunol. 2009. 39: 3121-3133.

Presta. "Antibody engineering", Curr. Op. Struct. Biol. 2:593-596 (1992).

Reichmann et al. "Reshaping human antibodies for therapy", Nature 332:323-329 (1988).

Ren et al. "Modification of cytokine-induced killer cells with chimeric antigen receptors (CARs) enhances antitumor immunity to epidermal growth factor receptor (EGFR)-positive malignancies", Cancer Immunol Immunother Dec. 2015; 64(12):1517-29.

Restifo, et al. "Adoptive immunotherapy for cancer: harnessing the T cell response", Nat Rev Immunol. ; 12(4): 269-281.

Romanski A, et al. "CD19-CAR engineered NK-92 cells are sufficient to overcome NK cell resistance in B-cell malignancies", J. cell. Mol. Med. 20(7):1287-94, 2016.

Rossolini et al. "Use of deoxyinosine-containing primers vs degenerate primers for polymerase chain reaction based on ambiguous sequence information", Mol. Cell. Probes 8:91-98 (1994).

Sambrook et al. (1989), "Molecular Cloning. A Laboratory Manual," Cold Spring Harbor Press, Plainview, New York.

Urbanska et al. "Targeted cancer immunotherapy via combination of designer bispecific antibody and novel gene-engineered T cells", J Transl Med. Dec. 13, 2014; 12:347.

Verma, R. et al., "Antibody engineering: Comparison of bacterial, yeast, insect and mammalian expression systems", J Immunol Methods. Jul. 1, 1998; 216(1-2):165-81.

Xin, G. et al. "Pathogen boosted adoptive cell transfer immunotherapy to treat solid tumors", Proc Natl Acad Sci U S A 114, 740-745 (2017).

Zhang, et al. "HMGB1 release by urothelial carcinoma cells is required for the in vivo antitumor response to Bacillus Calmette-Guerin", J Urol 189, 1541-1546 (2013).

Ortega et al. "Selection of a Single Domain Antibody, Specific for an HLA-Bound Epilope of the Mycobacterial Ag85B Antigen," Frontiers in Immunology, Oct. 2, 2020 {Oct. 2, 2020), vol. 11, pp. 1-10.

International Search Report, corresponding to PCT/US2020/063775, dated Mar. 24, 2021.

FIG. 2

| | Chain | Gene name | CDR3 amino acid motif | SEQ ID NO: |
|---|---|---|---|---|
| 1 | IGH_H2 | IGHV1-42*00<br>IGHJ2*00 | CARRRDFDYW | 16 |
| 2 | IGH_H4 | IGHV2-9-1*00<br>IGHD2-4*00<br>IGHJ2*00 | CARGGLRRGDYFDYW | 19 |
| 3 | IGK_K3 | IGKV3-7*00<br>IGKJ2*00 | CQHSWEIPYTF | 21 |
| 4 | IGK_K4 | IGKV19-93*00<br>IGKJ1*00 | CLQYDNLYTF | 23 |
| 5 | IGL_L3 | IGLV3*00<br>IGLJ2*00 | CGVGDTIKEQFVYVF | 26 |
| 6 | IGL_L4 | IGLV1*00<br>IGLJ1*00 | CALWYSNHWVF | 28 |

BCG CAR CONSTRUCTS AND METHODS OF THEIR MANUFACTURE AND USE

CROSS-REFERENCE TO RELATED APPLICATIONS

This application is the U.S. National Stage of PCT/US2020/063775 filed Dec. 8, 2020, which claims the benefit of U.S. Application No. 62/945,406, filed Dec. 9, 2019. The content of each of the above-referenced applications is incorporated herein by reference in its entirety.

SEQUENCE LISTING

A Sequence Listing accompanies this application and is submitted as an ASCII text file of the sequence listing named 00169 final amend.pdf which is 38470 bytes in size and was created on Dec. 7, 2020. The sequence listing is electronically submitted via EFS-Web with the application and is incorporated herein by reference in its entirety.

BACKGROUND

Since 1976, bladder cancer treatment has included intravessically instilled live-attenuated Bacillus Calmette-Guerin (BCG) to reduce recurrence and progression of the tumor. The inclusion of a BCG vaccine for patients recovering from bladder cancer is now a standard of care. However, a need in the art remains for improved treatments for bladder cancer.

Adoptive cell transfer (ACT) based immunotherapy in fighting cancer has recently attracted great interest. This approach includes engineering and expanding the tumor-infiltrating lymphocytes, which can recognize tumor associated antigens (TAAs), followed by infusing them into patients to induce a tumor specific immune response. Despite the recent success in treating hematopoietic malignancies (Maus, et al 2014), limited efficacy has been achieved in treating other solid tumor (Restifo, et al 2012).

One of the main stumbling blocks in the use of ACT is the number of transferred engineered T cells required to achieve therapeutic response is too few once injected into the patient and TILs isolated from malignant lesions readily lose their proliferative potential after ex vivo expansion with a high dose of IL-2 (Kalia et al 2010; Pipkin et al 2010).

To overcome this problem, autologous T cells are genetically engineered with a T cell receptor (TCR) or chimeric antigen receptor (CAR) to equip them with tumor reactivity, which has resulted in remarkable responses in hematological malignancies (Maude et al 2014). However, the heterogeneity of tumor cells makes this monoclonal T cell approach less efficient to establish durable and complete regression of most tumors. Furthermore, even high numbers of fully activated tumor-specific cytotoxic CD8+ T cells can fail to induce tumor regression due to their insufficient recruitment to tumor tissue (Ganss and Hanahan 1998, Ganss et al 2002 and Garbi et al 2004). The majority of solid tumors are stromal rich with disorganized vasculature, which creates physical barriers for efficient trafficking of therapeutic T cells to the tumor bed (Barnas, et al. 2010; Bellone et al 2013).

Lastly, another equally important major hurdle is the accumulation of immunosuppressive regulatory T cells (Tregs) and myeloid-derived suppressor cells (MDSCs) within the tumor microenvironment (Curiel et al 2007 and Lu et al 2011), which usually leads to the progressive loss of T cell effector function. Recent studies have shown that depletion of Treg by using either cyclophosphamide (Le et al 2012) or CD25 Abs (Poehlein et al 2009), or MDSC removal by sunitinib (Ko et al 2009) restored tumor-specific T cell responses. With all these limitations, treating solid tumors such as melanoma with immunotherapy remains difficult.

BRIEF SUMMARY OF THE INVENTION

In a first aspect, provided herein is an isolated antibody or antigen binding fragment thereof capable of binding Bacillus Calmette-Guerin (BCG) antigen Ag85B comprising: a light chain variable domain selected from the group consisting of (i) a light chain variable domain comprising a CDRL1 region of SEQ ID NO:20, a CDRL2 region of the amino acid sequence YAS, and a CDRL3 region of SEQ ID NO:21; (ii) a light chain variable domain comprising a CDRL1 region of SEQ ID NO:22, a CDRL2 region of the amino acid sequence YTS, and a CDRL3 region of SEQ ID NO:23; (iii) a light chain variable domain comprising a CDRL1 region of SEQ ID NO:24, a CDRL2 region of SEQ ID NO:25, and a CDRL3 region of SEQ ID NO:26; and (iv) a light chain variable domain comprising a CDRL1 region of SEQ ID NO:27, a CDRL2 region of the amino acid sequence GTN, and a CDRL3 region of SEQ ID NO:28; and a heavy chain variable domain selected from the group consisting of a heavy chain variable domain comprising a CDRH1 region of SEQ ID NO: 15, a CDRH2 region of the amino acid sequence T, and a CDRH3 region of SEQ ID NO: 16; and a heavy chain variable domain comprising a CDRH1 region of SEQ ID NO:17, a CDRH2 region of SEQ ID NO:18, and a CDRH3 region of SEQ ID NO:19.

In some embodiments, the antibody or fragment there of comprises a heavy and a light chain selected from the group consisting of: (a) a light chain comprising SEQ ID NO:11 or a sequence with at least 85% similarity to SEQ ID NO:11, and a heavy chain comprising SEQ ID NO:9 or a sequence with at least 85% similarity to SEQ ID NO:9; (b) a light chain comprising SEQ ID NO:11 or a sequence with at least 85% similarity to SEQ ID NO:11, and a heavy chain comprising SEQ ID NO:10 or a sequence with at least 85% similarity to SEQ ID NO:10; (c) a light chain comprising SEQ ID NO:12 or a sequence with at least 85% similarity to SEQ ID NO:12, and a heavy chain comprising SEQ ID NO:9 or a sequence with at least 85% similarity to SEQ ID NO:9; (d) a light chain comprising SEQ ID NO:12 or a sequence with at least 85% similarity to SEQ ID NO:12, and a heavy chain comprising SEQ ID NO:10 or a sequence with at least 85% similarity to SEQ ID NO:10; (e) a light chain comprising SEQ ID NO:13 or a sequence with at least 85% similarity to SEQ ID NO:13, and a heavy chain comprising SEQ ID NO:9 or a sequence with at least 85% similarity to SEQ ID NO:9; (f) a light chain comprising SEQ ID NO:13 or a sequence with at least 85% similarity to SEQ ID NO:13, and a heavy chain comprising SEQ ID NO:10 or a sequence with at least 85% similarity to SEQ ID NO:10; (g) a light chain comprising SEQ ID NO:14 or a sequence with at least 85% similarity to SEQ ID NO:14, and a heavy chain comprising SEQ ID NO:9 or a sequence with at least 85% similarity to SEQ ID NO:9; and (h) a light chain comprising SEQ ID NO:14 or a sequence with at least 85% similarity to SEQ ID NO:14, and a heavy chain comprising SEQ ID NO:10 or a sequence with at least 85% similarity to SEQ ID NO:10.

In some embodiments, the antibody is a single chain variable fragment (scFv). In some embodiments, the single chain variable fragment comprises a sequence selected from the group consisting of SEQ ID NOs:1-8.

In a second aspect, provided herein is a nucleic acid molecule encoding an Ag85B specific antibody or antigen binding fragment described herein.

In a third aspect, provided herein is a chimeric antigen receptor comprising an Ag85B specific antibody or antigen binding fragment as described herein, a transmembrane domain, and an intracellular signaling domain. In some embodiments, the intracellular signaling domain is selected from the group consisting of CD3ζ, FcRy, CD28, CD134, CD278, 4-IBB, OX40, ICOS, DAP-10, PD-1, LAG-3, 2B4, BTLA, CTLA-4, and combinations thereof. In some embodiments, the intracellular signaling domain comprises CD3ζ and 4-IBB.

In a forth aspect, provided herein is a nucleic acid encoding a chimeric antigen receptor as described herein.

In a fifth aspect, provided herein is an expression vector comprising a nucleic acid encoding a chimeric antigen receptor as described herein.

In a sixth aspect, provided herein is a cell comprising a chimeric antigen receptor as described herein. In some embodiments, the cell is a T cell, a B cell, a Natural Killer (NK) cell, a lymphocyte, a neutrophil or a macrophages.

In a seventh aspect, provided herein is a composition comprising a lymphocyte comprising a chimeric antigen receptor as described herein and a pharmaceutically acceptable carrier.

In an eighth aspect, provided herein is a method of treating cancer in a subject in need thereof comprising administering to the subject a therapeutically effective amount of a composition comprising a lymphocyte comprising a chimeric antigen receptor as described herein; and administering to the subject a therapeutically effective amount of a composition comprising Bacillus Calmette-Guerin (BCG) antigen Ag85B. In some embodiments, the lymphocyte composition is administered intravenously. In some embodiments, the composition comprising BCG antigen Ag85B is a BCG vaccine. In some embodiments, the cancer is bladder cancer, lung cancer, or melanoma. In some embodiments, the BCG antigen Ag85B composition is administered to the subject no more than 48 hours after administration of the lymphocyte composition.

In a ninth aspect, provided herein is a method of treating tuberculosis infection in a subject in need thereof comprising administering to the subject a therapeutically effective amount of a composition comprising a lymphocyte comprising a chimeric antigen receptor as described herein. In some embodiments, the composition is administered intravenously.

BRIEF DESCRIPTION OF THE DRAWINGS

FIG. 2 shows BCG-Ag85b-specific scFv amino acid motifs. Each scFV is made of a heavy chain and light chain. There are 2 heavy chains and 4 light chains. This results in 8 unique combinations.

DETAILED DESCRIPTION OF THE INVENTION

Figure 1:
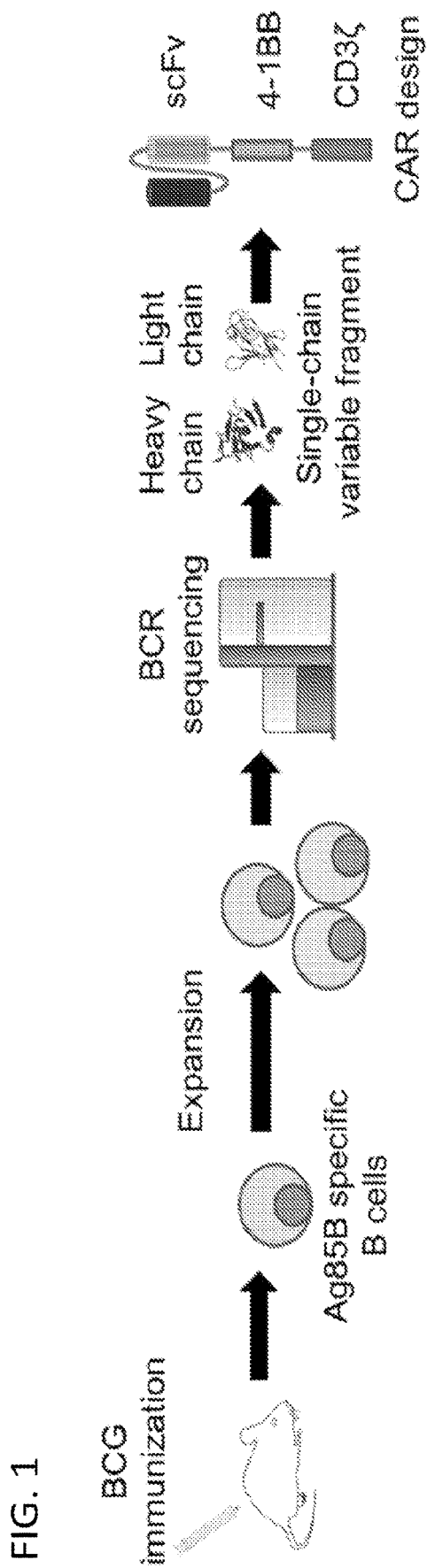
FIG. 1 shows an exemplary scheme for identification of the BCG-specific scFvs described herein.

The present disclosure provides antibodies that specifically/selectively bind to BCG antigen Ag85B. These single chain variable fragments (scFvs) can be incorporated into standard chimeric antigen receptor (CAR) approaches for the treatment of diseases or conditions as described herein.

By using in vivo immunization, in vitro screening, and sequencing techniques eight scFvs, K3-H2 (SEQ ID NO:1), K3-H4 (SEQ ID NO:2), K4-H2 (SEQ ID NO:3), K4-H4 (SEQ ID NO:4), L3-H2 (SEQ ID NO:5), L3-H4 (SEQ ID NO:6), L4-H2 (SEQ ID NO:7), and L4-H4 (SEQ ID NO:8), clearly bound BCG antigen Ag85B.

The present disclosure provides an isolated antibody or antigen-binding fragment thereof capable of selectively binding to BCG antigen Ag85B. By "selectively" or "specifically" we mean an antibody capable of binding Ag85B but does not bind to other BCG antigens or to other mycobacterial antigens. By binding, we mean that the antibodies are capable of detection at a given tissue's endothelium by standard methods (e.g., tissue section immunofluorescence assays.) By "antibody" we mean to include single chain antibodies, such as K3-H2, K3-H4, K4-H2, K4-H4, L3-H2, L3-H4, L4-H2, and L4-H4, and antibody fragments, such as the polypeptides comprising CDR domains within K3-H2, K3-H4, K4-H2, K4-H4, L3-H2, L3-H4, L4-H2, and L4-H4, and chimeric antibodies containing the CDR domains within K3-H2, K3-H4, K4-H2, K4-H4, L3-H2, L3-H4, L4-H2, and L4-H4.

TABLE 1

Heavy and Light Chain CDR sequences

| Chain | total AA | CDR1 position | CDR1 AA seq | SEQ ID NO: | CDR2 position | CDR2 AA seq | SEQ ID NO: | CDR3 position | CDR3 AA seq | SEQ ID NO: |
|---|---|---|---|---|---|---|---|---|---|---|
| H2 | 166 | 61-68 | GYSFTGYY | 15 | 74 | T | NR | 112-121 | CARRRDFDYW | 16 |
| H4 | 119 | 26-33 | GFSLTSYA | 17 | 51-57 | IWTGGGT | 18 | 95-109 | CARGGLRRGDYFDYW | 19 |
| K3 | 111 | 27-36 | QSVSTSSYSY | 20 | 54-56 | YAS | NR | 92-102 | CQHSWEIPYTF | 21 |
| K4 | 133 | 47-52 | QDINKY | 22 | 70-72 | YTS | NR | 108-117 | CLQYDNLYTF | 23 |
| L3 | 114 | 26-31 | SQHSYT | 24 | 49-55 | LKKDGSH | 25 | 91-105 | CGVGDTIKEQFVYVF | 26 |
| L4 | 109 | 26-34 | TGAVTTSNY | 27 | 52-54 | GTN | NR | 90-100 | CALWYSNHWVF | 28 |

K3-H2 (SEQ ID NO: 1), (CDRH1 (SEQ ID NO: 15), *CDRH2*, CDRH3 (SEQ ID NO: 16), {linker} (SEQ ID NO: 29), *CDRL1* (SEQ ID NO: 20), CDRL2, *CDRL3* (SEQ ID NO: 21))
DIVLTQSPASLAVSLGQRATISCRAS*QSVSTSSYSY*MHWYQQKPGQPPKLLIKYASNLE
SGVPARFSGSGSGTDFTLNIHPVEEDTATYY*CQHSWEIPYTF*GGGTKLEIK{GSTSGS
GKPGSGEGSTKG}ICPMSSPQSLKTRTLTMGWNWIFILILSVTTGVHSEVQLQQSGPEL
VKPGASVKISCKASGYSFTGYYMNWV*T*TYNQKFKAKATLTVDKSSSTAYMQLKS
LTSEDSAVYYCARRRDFDYWGQGTTLTVSSAKTTPPSVYPLAPGSAAQTNSMVTLG
CLVKGYFPE K3-H4 (SEQ ID NO: 2), (CDRH1 (SEQ ID NO: 17), *CDRH2* (SEQ ID NO: 18), CDRH3 (SEQ ID NO: 19), {linker} (SEQ ID NO: 29), *CDRL1* (SEQ ID NO: 20), CDRL2, *CDRL3* (SEQ ID NO: 21))
DIVLTQSPASLAVSLGQRATISCRAS*QSVSTSSYSY*MHWYQQKPGQPPKLLIKYASNLE
SGVPARFSGSGSGTDFTLNIHPVEEDTATYY*CQHSWEIPYTF*GGGTKLEIK{GSTSGS
GKPGSGEGSTKG}QVQLKESGPGLVAPSQSLSITCTVSGFSLTSYAISWVRQPPGKGL
EWLGV*IWTGGGT*NYNSALKSRLSISKDNSKSQVFLKMNSLQTDDTARYY**CARGGL
RRGDYFDYWGQGTTLTVSS K4-H2 (SEQ ID NO: 3), (CDRH1** (SEQ ID NO: 15), *CDRH2*, CDRH3 (SEQ ID NO: 16), {linker} (SEQ ID NO: 29), *CDRL1* (SEQ ID NO: 22), CDRL2, *CDRL3* (SEQ ID NO: 23))
MRPSIQFLGLLLFWLHGAQCDIQMTQSPSSLSASLGGKVTITCKAS*QDINKY*IAWQH
KPGKGPRLLIHYTSTLQPGIPSRFSGSGSGRDYSFSISNLEPEDIATYY*CLQYDNLYTF*G
GGTKLEIKGSTSGSG{GSTSGSGKPGSGEGSTKG}ICPMSSPQSLKTRTLTMGWNWIFI
LILSVTTGVHSEVQLQQSGPELVKPGASVKISCKASGYSFTGYYMNWV*T*TYNQKF
KAKATLTVDKSSSTAYMQLKSLTSEDSAVYYCARRRDFDYWGQGTTLTVSSAKTT
PPSVYPLAPGSAAQTNSMVTLGCLVKGYFPE K4-H4 (SEQ ID NO: 4), (CDRH1 (SEQ ID NO: 17), *CDRH2* (SEQ ID NO: 18), *CDRH3* (SEQ ID NO: 19), {linker} (SEQ ID NO: 29), *CDRL1* (SEQ ID NO: 22), CDRL2, *CDRL3* (SEQ ID NO: 23))
MRPSIQFLGLLLFWLHGAQCDIQMTQSPSSLSASLGGKVTITCKAS*QDINKY*IAWQH
KPGKGPRLLIHYTSTLQPGIPSRFSGSGSGRDYSFSISNLEPEDIATYY*CLQYDNLYTF*G
GGTKLEIKGSTSGSG{GSTSGSGKPGSGEGSTKG}QVQLKESGPGLVAPSQSLSITCTV
SGFSLTSYAISWVRQPPGKGLEWLGV*IWTGGGT*NYNSALKSRLSISKDNSKSQVFLK
MNSLQTDDTARYYARGGLRRGDYFDYWGQGTTLTVSS L3-H2 (SEQ ID NO: 5), (CDRH1 (SEQ ID NO: 15), *CDRH2*, CDRH3 (SEQ ID NO: 16), {linker} (SEQ ID NO: 29), *CDRL1* (SEQ ID NO: 24), CDRL2 (SEQ ID NO: 25), *CDRL3* (SEQ ID NO: 26))
QLVLTQSSSASFSLGASAKLTCTLS*SQHSYT*IEWYQQQPLKPPKYVMELKKDGSHSTG
DGIPDRFSGSSSGADRYLSISNIQPEDEAIYI*CGVGDTIKEQFVYVF*GGGTKVTVLIGSTS
GSGKPGSGEGSTKG}ICPMSSPQSLKTRTLTMGWNWIFILILSVTTGVHSEVQLQQSG
PELVKPGASVKISCKASGYSFTGYYMNWV*T*TYNQKFKAKATLTVDKSSSTAYMQ
LKSLTSEDSAVYYCARRRDFDYWGQGTTLTVSSAKTTPPSVYPLAPGSAAQTNSMV
TLGCLVKGYFPE L3-H4 (SEQ ID NO: 6), (CDRH1 (SEQ ID NO: 17), *CDRH2* (SEQ ID NO: 18), CDRH3 (SEQ ID NO: 19), {linker} (SEQ ID NO: 29), *CDRL1* (SEQ ID NO: 24), CDRL2 (SEQ ID NO: 25), *CDRL3* (SEQ ID NO: 26))
QLVLTQSSSASFSLGASAKLTCTLS*SQHSYT*IEWYQQQPLKPPKYVMELKKDGSHSTG
DGIPDRFSGSSSGADRYLSISNIQPEDEAIYI*CGVGDTIKEQFVYVF*GGGTKVTVL{GSTS
GSGKPGSGEGSTKG}QVQLKESGPGLVAPSQSLSITCTVSGFSLTSYAISWVRQPPGK
GLEWLGV*IWTGGGT*NYNSALKSRLSISKDNSKSQVFLKMNSLQTDDTARYY**CARG
GLRRGDYFDYWGQGTHTVSS -continued L4-H2 (SEQ ID NO: 7), (CDRH1** (SEQ ID NO: 15), *CDRH2*, CDRH3 (SEQ ID
NO: 16), {linker} (SEQ ID NO: 29), CDRL1 (SEQ ID NO: 27), CDRL2, CDRL3 (SEQ ID
NO: 28))
QAVVTQESALTTSPGETVTLTCRSS*TGAVTTSNY*ANWVQEKPDHLFTGLIGGTNNRAP
GVPARFSGSLIGDKAALTITGAQTEDEAIYF*CALWYSNHWVF*GGGTKLTVL{GSTSGS
GKPGSGEGSTKG}ICPMSSPQSLKTRTLTMGWNWIFILILSVTTGVHSEVQLQQSGPEL
VKPGASVKISCKASGYSFTGYYMNWVM*T*TYNQKFKAKATLTVDKSSSTAYMQLKS
LTSEDSAVYYCARRRDFDYWGQGTTLTVSSAKTTPPSVYPLAPGSAAQTNSMVTLG
CLVKGYFPE L4-H4 (SEQ ID NO: 8), (CDRH1 (SEQ ID NO: 17), *CDRH2* (SEQ ID NO: 18),
CDRH3 (SEQ ID NO: 19), {linker} (SEQ ID NO: 29), CDRL1 (SEQ ID NO: 27), CDRL2,
CDRL3 (SEQ ID NO: 28))
QAVVTQESALTTSPGETVTLTCRSS*TGAVTTSNY*WVQEKPDHLFTGLIGGTNNRAP
GVPARFSGSLIGDKAALTITGAQTEDEAIYF*CALWYSNHWVF*GGGTKLTVL{GSTSGS
GKPGSGEGSTKG}QVQLKESGPGLVAPSQSLSITCTVSGFSLTSYAISWVRQPPGKGL
EWLGV*IWTGGGT*NYNSALKSRLSISKDNSKSQVFLKMNSLQTDDTARYY**CARGGL
RRGDYFDYWGQGTTLTVSS H2 (SEQ ID NO: 9), (CDRH1** (SEQ ID NO: 15), *CDRH2*, CDRH3 (SEQ ID
NO: 16))
ICPMSSPQSLKTRTLTMGWNWIFILILSVTTGVHSEVQLQQSGPELVKPGASVKISCK
ASGYSFTGYYMNWVM*T*TYNQKFKAKATLTVDKSSSTAYMQLKSLTSEDSAVYY**CA
RRRDFDYWGQGTTLTVSSAKTTPPSVYPLAPGSAAQTNSMVTLGCLVKGYFPE H4 (SEQ ID NO: 10), (CDRH1** (SEQ ID NO: 17), *CDRH2* (SEQ ID NO: 18),
CDRH3 (SEQ ID NO: 19))
QVQLKESGPGLVAPSQSLSITCTVSGFSLTSYAISWVRQPPGKGLEWLGV*IWTGGGT*
NYNSALKSRLSISKDNSKSQVFLKMNSLQTDDTARYYCARGGLRRGDYFDYWGQG
TTLTVSS K3 (SEQ ID NO: 11), (*CDRL1* (SEQ ID NO: 20), CDRL2, CDRL3 (SEQ ID
NO: 21))
DIVLTQSPASLAVSLGQRATISCRAS*QSVSTSSYSY*MHWYQQKPGQPPKLLIKYASNLE
SGVPARFSGSGSGTDFTLNIHPVEEEDTATYY*CQHSWEIPYTF*GGGTKLEIK K4 (SEQ ID NO: 12), (*CDRL1* (SEQ ID NO: 22), CDRL2, CDRL3 (SEQ ID
NO: 23))
MRPSIQFLGLLLFWLHGAQCDIQMTQSPSSLSASLGGKVTITCKAS*QDINKY*IAWYQH
KPGKGPRLLIHYTSTLQPGIPSRFSGSGSGRDYSFSISNLEPEDIATYY*CLQYDNLYTF*G
GGTKLEIKGSTSGSG L3 (SEQ ID NO: 13), (*CDRL1* (SEQ ID NO: 24), CDRL2 (SEQ ID NO: 25), *CDRL3*
(SEQ ID NO: 26))
QLVLTQSSSASFSLGASAKLTCTLS*SQHSYTI*EWYQQQPLKPPKYVMELKKDGSHSTG
DGIPDRFSGSSSGADRYLSISNIQPEDEAIYI*CGVGDTIKEQFVYVF*GGGTKVTVL L4 (SEQ ID NO: 14), (*CDRL1* (SEQ ID NO: 27), CDRL2, CDRL3 (SEQ ID
NO: 28))
QAVVTQESALTTSPGETVTLTCRSS*TGAVTTSNY*ANWVQEKPDHLFTGLIGGTNNRAP
GVPARFSGSLIGDKAALTITGAQTEDEAIYF*CALWYSNHWVF*GGGTKLTVL The terms "antibody" or "antibody molecule" are used herein interchangeably and refer to immunoglobulin molecules or other molecules which comprise an antigen binding domain. The term "antibody" or "antibody molecule" as used herein is thus intended to include whole antibodies (e.g., IgG, IgA, IgE, IgM, or IgD), monoclonal antibodies, polyclonal antibodies, chimeric antibodies, humanized antibodies, and antibody fragments, including single chain variable fragments (scFvs), single domain antibody, and antigen-binding fragments, genetically engineered antibodies, among others, as long as the characteristic properties (e.g., ability to bind Ag85B) are retained.

As stated above, the term "antibody" includes "antibody fragments" or "antibody-derived fragments" which comprise an antigen binding domain. The term "antibody fragment" as used herein is intended to include any appropriate antibody fragment that displays antigen binding function, for example, Fab, Fab', F(ab')2, scFv, Fv, dsFv, ds-scFv, Fd, dAbs, TandAbs dimers, mini bodies, monobodies, diabodies, and multimers thereof and bispecific antibody fragments. Antibodies can be genetically engineered from the CDRs and K3-H2, K3-H4, K4-H2, K4-H4, L3-H2, L3-H4, L4-H2, and L4-H4 sequences described herein into antibodies and antibody fragments by using conventional techniques such as, for example, synthesis by recombinant techniques or chemical synthesis. Techniques for producing antibody fragments are well known and described in the art.

One may wish to engraft one or more CDRs from scFvs K3-H2, K3-H4, K4-H2, K4-H4, L3-H2, L3-H4, L4-H2, and L4-H4, the entire scFv, or fragments of the scFvs into alternate scaffolds. For example, standard molecular biological techniques can be used to transfer the DNA sequences encoding the antibody's CDR(s) or scFv to (1) full IgG scaffold of human or other species; (2) another scFv scaffold of human or other species, or (3) other specialty vectors. If the CDR(s) have been transferred to a new scaffold all of the previous modifications described can also be performed. For example, one could consult *Biotechnol Genet Eng Rev,* 2013, 29:175-86 for a review of useful methods.

In some embodiments, an isolated Ag85B antibody or antigen-binding fragment thereof includes a heavy chain variable domain comprising a CDRH1 region consisting of SEQ ID NO:15, a CDRH2 region consisting of the amino acid sequence T, and a CDRH3 region consisting of SEQ ID NO:16 and a light chain variable domain comprising a CDRL1 region consisting of SEQ ID NO:20, a CDRL2 region consisting of the amino acid sequence YAS, and a CDRL3 region consisting of SEQ ID NO:21. In some embodiments, the Ag85B antibody or antigen-binding fragment thereof comprises, consist essentially of, or consists of SEQ ID NO:1.

In some embodiments, an isolated Ag85B antibody or antigen-binding fragment thereof includes a heavy chain variable domain comprising a CDRH1 region consisting of SEQ ID NO:17, a CDRH2 region consisting of SEQ ID NO:18, and a CDRH3 region consisting of SEQ ID NO:19 and a light chain variable domain comprising a CDRL1 region consisting of SEQ ID NO:20, a CDRL2 region consisting of the amino acid sequence YAS, and a CDRL3 region consisting of SEQ ID NO:21. In some embodiments, the Ag85B antibody or antigen-binding fragment thereof comprises, consist essentially of, or consists of SEQ ID NO:3.

In some embodiments, an isolated Ag85B antibody or antigen-binding fragment thereof includes a heavy chain variable domain comprising a CDRH1 region consisting of SEQ ID NO:15, a CDRH2 region consisting of the amino acid sequence T, and a CDRH3 region consisting of SEQ ID NO:16 and a light chain variable domain comprising a CDRL1 region consisting of SEQ ID NO:22, a CDRL2 region consisting of the amino acid sequence YTS, and a CDRL3 region consisting of SEQ ID NO:23. In some embodiments, the Ag85B antibody or antigen-binding fragment thereof comprises, consist essentially of, or consists of SEQ ID NO:5.

In some embodiments, an isolated Ag85B antibody or antigen-binding fragment thereof includes a heavy chain variable domain comprising a CDRH1 region consisting of SEQ ID NO:17, a CDRH2 region consisting of SEQ ID NO:18, and a CDRH3 region consisting of SEQ ID NO:19 and a light chain variable domain comprising a CDRL1 region consisting of SEQ ID NO:22, a CDRL2 region consisting of the amino acid sequence YTS, and a CDRL3 region consisting of SEQ ID NO:23. In some embodiments, the Ag85B antibody or antigen-binding fragment thereof comprises, consist essentially of, or consists of SEQ ID NO:7.

In some embodiments, an isolated Ag85B antibody or antigen-binding fragment thereof includes a heavy chain variable domain comprising a CDRH1 region consisting of SEQ ID NO:15, a CDRH2 region consisting of the amino acid sequence T, and a CDRH3 region consisting of SEQ ID NO:16 and a light chain variable domain comprising a CDRL1 region consisting of SEQ ID NO:24, a CDRL2 region consisting of SEQ ID NO:25, and a CDRL3 region consisting of SEQ ID NO:26. In some embodiments, the Ag85B antibody or antigen-binding fragment thereof comprises, consist essentially of, or consists of SEQ ID NO:2.

In some embodiments, an isolated Ag85B antibody or antigen-binding fragment thereof includes a heavy chain variable domain comprising a CDRH1 region consisting of SEQ ID NO:17, a CDRH2 region consisting of SEQ ID NO:18, and a CDRH3 region consisting of SEQ ID NO:19 and a light chain variable domain comprising a CDRL1 region consisting of SEQ ID NO:24, a CDRL2 region consisting of SEQ ID NO:25, and a CDRL3 region consisting of SEQ ID NO:26. In some embodiments, the Ag85B antibody or antigen-binding fragment thereof comprises, consist essentially of, or consists of SEQ ID NO:4.

In some embodiments, an isolated Ag85B antibody or antigen-binding fragment thereof includes a heavy chain variable domain comprising a CDRH1 region consisting of SEQ ID NO:15, a CDRH2 region consisting of the amino acid sequence T, and a CDRH3 region consisting of SEQ ID NO:16 and a light chain variable domain comprising a CDRL1 region consisting of SEQ ID NO:27, a CDRL2 region consisting of the amino acid sequence GTN, and a CDRL3 region consisting of SEQ ID NO:28. In some embodiments, the Ag85B antibody or antigen-binding fragment thereof comprises, consist essentially of, or consists of SEQ ID NO:6.

In some embodiments, an isolated Ag85B antibody or antigen-binding fragment thereof includes a heavy chain variable domain comprising a CDRH1 region consisting of SEQ ID NO:17, a CDRH2 region consisting of SEQ ID NO:18, and a CDRH3 region consisting of SEQ ID NO:19 and a light chain variable domain comprising a CDRL1 region consisting of SEQ ID NO:27, a CDRL2 region consisting of the amino acid sequence GTN, and a CDRL3 region consisting of SEQ ID NO:28. In some embodiments, the Ag85B antibody or antigen-binding fragment thereof comprises, consist essentially of, or consists of SEQ ID NO:8.

In some embodiments, the Ag85B-selective antibody or antigen-binding fragment thereof is engrafted within a full IgG, IgA, IgE, IgM, or IgD scaffold of human or other species or a scFv scaffold of human or other species.

In some embodiments, the protein sequence of the Ag85B-selective antibody comprises conservative or inconsequential substitutions or deletions.

The antibodies or antibody fragments can be wholly or partially synthetically produced. Thus the antibody may be from any appropriate source, for example recombinant sources and/or produced in transgenic animals or transgenic plants. Thus, the antibody molecules can be produced in vitro or in vivo. Preferably the antibody or antibody fragment comprises an at least the heavy chain variable region ($V_H$) which generally comprises the antigen binding site. In preferred embodiments, the antibody or antibody fragment comprises the heavy chain variable region and light chain variable region ($V_L$). The antibody or antibody fragment can be made that comprises all or a portion of a heavy chain constant region, such as an IgG1, IgG2, IgG3, IgG4, IgA1, IgA2, IgE, IgM or IgD constant region.

Furthermore, the antibody or antibody fragment can comprise all or a portion of a kappa light chain constant region or a lambda light chain constant region. All or part of such constant regions may be produced wholly or partially synthetic. Appropriate sequences for such constant regions are well known and documented in the art.

The term "fragment" as used herein refers to fragments of biological relevance (functional fragment), e.g., fragments which can contribute to or enable antigen binding, e.g., form part or all of the antigen binding site or can contribute to the prevention of the antigen interacting with its natural ligands. Fragments in some embodiments comprise a heavy chain variable region ($V_H$ domain) and light chain variable region ($V_L$) of the invention. In some embodiments, the fragments comprise one or more of the heavy chain complementarity determining regions (CDRHs) of the antibodies or of the $V_H$ domains, and one or more of the light chain complementarity determining regions (CDRLs), or $V_L$ domains to form the antigen binding site. For example, a fragment is suitable for use in the present methods and kits if it retains its ability to bind to BCG antigen Ag85B.

The term "complementarity determining regions" or "CDRs," as used herein, refers to part of the variable chains in immunoglobulins (antibodies) and T cell receptors, generated by B-cells and T-cells respectively, where these molecules bind to their specific antigen. As the most variable parts of the molecules, CDRs are crucial to the diversity of antigen specificities generated by lymphocytes. There are three CDRs (CDR1, CDR2 and CDR3), arranged non-consecutively, on the amino acid sequence of a variable domain of an antigen receptor. Since the antigen receptors are typically composed of two variable domains (on two different polypeptide chains, heavy and light chain), there are six CDRs for each antigen receptor that can collectively come into contact with the antigen. A single whole antibody molecule has two antigen receptors and therefore contains twelve CDRs. Sixty CDRs can be found on a pentameric IgM molecule. A scFv may include six CDRs, three on the heavy chain and three on the light chain.

Within the variable domain, CDR1 and CDR2 may be found in the variable (V) region of a polypeptide chain, and CDR3 includes some of V, all of diversity (D, heavy chains only) and joining (J) regions. Since most sequence variation associated with immunoglobulins and T cell receptors is found in the CDRs, these regions are sometimes referred to as hypervariable regions. Among these, CDR3 shows the greatest variability as it is encoded by a recombination of VJ in the case of a light chain region and VDJ in the case of heavy chain regions. The tertiary structure of an antibody is important to analyze and design new antibodies.

The term "single-chain variable fragment," "single-chain fragment variable" or "scFv," as used herein, refers to a fusion protein of the variable regions of the heavy ($V_H$) and light chains ($V_L$) of immunoglobulins, connected with a short linker peptide of ten to about 25 amino acids. The linker may usually be rich in glycine for flexibility, as well as serine or threonine for solubility, and can either connect the N-terminus of the $V_H$ with the C-terminus of the $V_L$, or vice versa. scFvs may often be produced in microbial cell cultures such as E. coli or Saccharomyces cerevisiae.

ScFvs have many uses, e.g., flow cytometry, immunohistochemistry, and as antigen-binding domains of artificial T cell receptors. In one embodiment, the present invention discloses scFvs. In one embodiment, a scFvs can be designed and made that contain the three heavy chain variable domains, CDRH1, CDRH2, and CDRH3, e.g., SEQ ID NOs: 15, the amino acid sequence T, and 16 or SEQ ID Nos: 17, 18, and 19, and three light chain variable domains, CDRL1, CDRL2 and CDRL3, e.g., SEQ ID NOs:20, the amino acid sequence YAS, and 21 or SEQ ID NO:22, the amino acid sequence YTS, and 23, or SEQ ID NOs:24, 25, and 26 or SEQ ID NOs:27, the amino acid sequence of GTN, and 28, respectively.

In one embodiment, the antibody or fragment comprises CDRH1, CDRH2 and CDRH3 of (a) SEQ ID NO:15, the amino acid sequence T, and SEQ ID NO:16 or (b) SEQ ID NO:17, SEQ ID NO:18, and SEQ ID NO:19, respectively. In further embodiments, the antibody or fragment comprises CDRL1, CDRL2 and CDRL3 of (a) SEQ ID NO:20, the amino acid sequence YAS, and SEQ ID NO:21, or (b) SEQ ID NO:22, the amino acid sequence YTS, and SEQ ID NO:23, or (c) SEQ ID NO:24, SEQ ID NO:25, and SEQ ID NO:26, or (d) SEQ ID NO:27, the amino acid sequence GTN, and SEQ ID NO:28, respectively. In some embodiments, additional polypeptide sequence is found linking the CDR1, CDR2 and CDR3 in order to allow for the formation of the proper three dimensional antigen binding site of the antibody or fragment so that the antibody or fragment is capable of binding to BCG antigen Ag85B.

In another embodiment, the antibody comprises, consists essentially of, consists of or is the polypeptide of SEQ ID NO:1, SEQ ID NO:2, SEQ ID NO:3, SEQ ID NO:4, SEQ ID NO:5, SEQ ID NO:6, SEQ ID NO:7 or SEQ ID NO:8.

In some embodiments, the antibodies have substantial identity to the polypeptide found in SEQ ID NO:1. In some embodiments, the antibodies have at least 50% identity to SEQ ID NO:1, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:1 (e.g. SEQ ID NO:15, the amino acid sequence T, and SEQ ID NO:16). In some embodiments, the antibodies further have 100% sequence identity with CDRL1, CDRL2 and CDRL3 within SEQ ID NO:1 (e.g. SEQ ID NO:20, the amino acid sequence YAS, and SEQ ID NO:21).

In some embodiments, the antibodies have substantial identity to the polypeptide found in SEQ ID NO:2. In some embodiments, the antibodies have at least 50% identity to SEQ ID NO:2, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:2 (e.g. SEQ ID NOs: 17-19). In some embodiments, the antibodies further have 100% sequence identity with CDRL1, CDRL2 and CDRL3 within SEQ ID NO:2 (e.g. SEQ ID NO:20, the amino acid sequence YAS, and SEQ ID NO:21).

In some embodiments, the antibodies have substantial identity to the polypeptide found in SEQ ID NO:3. In some embodiments, the antibodies have at least 50% identity to SEQ ID NO:3, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:3 (e.g. SEQ ID NO:15, the amino acid sequence T, and SEQ ID NO:16). In some embodiments, the antibodies further have 100% sequence identity with CDRL1, CDRL2 and CDRL3 within SEQ ID NO:3 (e.g. SEQ ID NO:22, the amino acid sequence YTS, and SEQ ID NO:23).

In some embodiments, the antibodies have substantial identity to the polypeptide found in SEQ ID NO:4. In some embodiments, the antibodies have at least 50% identity to SEQ ID NO:4, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:4 (e.g. SEQ ID NOs. 17-19). In some embodiments, the antibodies further have 100% sequence identity with CDRL1, CDRL2 and CDRL3 within SEQ ID NO:4 (e.g. SEQ ID NO:22, the amino acid sequence YTS, and SEQ ID NO:23).

In some embodiments, the antibodies have substantial identity to the polypeptide found in SEQ ID NO:5. In some embodiments, the antibodies have at least 50% identity to SEQ ID NO:5, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:5 (e.g. SEQ ID NO:15, the amino acid sequence T, and SEQ ID NO:16). In some embodiments, the antibodies further have 100% sequence identity with CDRL1, CDRL2 and CDRL3 within SEQ ID NO:5 (e.g. SEQ ID NOs:24-26).

In some embodiments, the antibodies have substantial identity to the polypeptide found in SEQ ID NO:6. In some embodiments, the antibodies have at least 50% identity to SEQ ID NO:6, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:6 (e.g. SEQ ID NOs: 17-'9). In some embodiments, the antibodies further have 100% sequence identity with CDRL1, CDRL2 and CDRL3 within SEQ ID NO:6 (e.g. SEQ ID NOs:24-26).

In some embodiments, the antibodies have substantial identity to the polypeptide found in SEQ ID NO:7. In some embodiments, the antibodies have at least 50% identity to SEQ ID NO:7, alternatively at least 75% sequence identity, alternatively at least 80% sequence identity, alternatively at least 90% sequence identity, alternatively at least 95% sequence identity, alternatively at least 98% sequence identity, alternatively at least 100% sequence identity. In some embodiments, the modified protein has at least 100% sequence identity within CDRH1, CDRH2 and CDRH3 within SEQ ID NO:7 (e.g. SEQ ID NO:15, the amino acid sequence T, and SEQ ID NO:16). In some embodiments, the antibodies further have 100% sequence identity with CDRL1, CDRL2 and CDRL3 within SEQ ID NO:7 (e.g. SEQ ID NO:27, the amino acid sequence GTN, and SEQ ID NO:28).

In some embodiments, the antibodies have substantial identity to the protein found in SEQ ID NO:8. In some embodiments, the antibodies have at least 50% identity to SEQ ID NO:8, alternatively at least 75% sequence identity, alternatively at least 80% sequence identity, alternatively at least 90% sequence identity, alternatively at least 95% sequence identity alternatively at least 98% sequence identity, alternatively at least 100% sequence identity. In some embodiments, the modified protein has at least 100% sequence identity within CDRH1, CDRH2 and CDRH3 within SEQ ID NO:8 (e.g. SEQ ID NOs:17-19). In some embodiments, the antibodies further have 100% sequence identity with CDRL1, CDRL2 and CDRL3 within SEQ ID NO:8 (e.g. SEQ ID NO:27, the amino acid sequence GTN, and SEQ ID NO:28).

Protein and nucleic acid sequence identities are evaluated using the Basic Local Alignment Search Tool ("BLAST") which is well known in the art (Karlin and Altschul, 1990, *Proc. Natl. Acad. Sci. USA* 87: 2267-2268; Altschul et al., 1997, *Nucl. Acids Res.* 25: 3389-3402). The BLAST programs identify homologous sequences by identifying similar segments, which are referred to herein as "high-scoring segment pairs," between a query amino or nucleic acid sequence and a test sequence which is preferably obtained from a protein or nucleic acid sequence database. Preferably, the statistical significance of a high-scoring segment pair is evaluated using the statistical significance formula (Karlin and Altschul, 1990), the disclosure of which is incorporated by reference in its entirety. The BLAST programs can be used with the default parameters or with modified parameters provided by the user.

"Percentage of sequence identity" is determined by comparing two optimally aligned sequences over a comparison window, wherein the portion of the polynucleotide sequence in the comparison window may comprise additions or deletions (i.e., gaps) as compared to the reference sequence (which does not comprise additions or deletions) for optimal alignment of the two sequences. The percentage is calculated by determining the number of positions at which the identical nucleic acid base or amino acid residue occurs in both sequences to yield the number of matched positions, dividing the number of matched positions by the total number of positions in the window of comparison and multiplying the result by 100 to yield the percentage of sequence identity.

The term "substantial identity" of polynucleotide sequences means that a polynucleotide comprises a sequence that has at least 25% sequence identity. Alternatively, percent identity can be any integer from 25% to 100%. More preferred embodiments include at least: 25%, 30%, 35%, 40%, 45%, 50%, 55%, 60%, 65%, 70%, 75%, 80%, 85%, 86%, 87%, 88%, 89%, 90%, 91%, 92%, 93%, 94%, 95%, 96%, 97%, 98% or 99% compared to a reference sequence using the programs described herein; preferably BLAST using standard parameters, as described. These values can be appropriately adjusted to determine corresponding identity of proteins encoded by two nucleotide sequences by taking into account codon degeneracy, amino acid similarity, reading frame positioning and the like.

"Substantial identity" of amino acid sequences for purposes of this invention normally means polypeptide sequence identity of at least 40%. Preferred percent identity of polypeptides can be any integer from 40% to 100%. More preferred embodiments include at least 40%, 45%, 50%, 55%, 60%, 65%, 70%, 75%, 80%, 85%, 86%, 87%, 88%, 89%, 90%, 91%, 92%, 93%, 94%, 95%, 96%, 97%, 98%, %, or 99%.

The terms "monoclonal antibody" or "monoclonal antibody composition" as used herein refer to a preparation of antibody molecules of a single amino acid composition. The monoclonal antibody also includes "human monoclonal antibody" which refers to antibodies displaying a single binding specificity which have variable and constant regions derived from human germline immunoglobulin sequences. The human monoclonal antibodies can be produced by a hybridoma which includes a B cell obtained from a transgenic nonhuman animal, for example, a transgenic mouse, having a genome comprising a human heavy chain transgene and a light human chain transgene fused to an immortalized cell.

The term "chimeric antibody" refers to an antibody comprising a variable region, i.e., binding region, from one source or species and at least a portion of a constant region derived from a different source or species, usually prepared by recombinant DNA techniques. Other forms of "chimeric antibodies" are those in which the class or subclass has been modified or changed from that of the original antibody. Such "chimeric" antibodies are also referred to as "class-switched antibodies." Methods for producing chimeric antibodies involve conventional recombinant DNA and gene transfection techniques now well known in the art.

The term "antibody" also shall include humanized antibody, human antibody and recombinant human antibody. The term "humanized antibody" refers to antibodies in which the human framework have been modified to comprise fragments of antibodies taken from a different species that provide specificity to an antigen and includes "humanized" forms of non-human (e.g., murine, rat, etc.) antibodies (including antigen-binding fragments thereof), which are chimeric antibodies containing minimal sequence derived from non-human immunoglobulin. Humanized antibodies include human immunoglobulins or fragments thereof in which hypervariable region residues of the human antibody or fragment are replaced by hypervariable region residues from a non-human species (donor antibody) such as mouse, rat, rabbit or nonhuman primate having the desired specificity, affinity, and capacity. In some instances, Fv framework region (FR) residues of the human immunoglobulin are replaced by corresponding non-human residues. In some instances, humanized antibodies may comprise residues which are not found in the recipient antibody or in the donor antibody and are made to further refine antibody performance. In general, the humanized antibody will comprise substantially all of at least one, and typically two or three variable domains, in which all or substantially all of the hypervariable loops correspond to those of a non-human immunoglobulin and all or substantially all of the FR regions are those of a human immunoglobulin sequence. In some aspects, the humanized antibody optionally also will comprise at least a portion of an immunoglobulin constant region (Fc), typically that of a human immunoglobulin. For further details, see Jones et al., *Nature* 321:522-525 (1986); Reichmann et al., *Nature* 332:323-329 (1988); and Presta, *Curr. Op. Struct. Biol.* 2:593-596 (1992). For example, in one embodiment, the invention provides a humanized scFv antibody or antigen binding fragment thereof comprising the CDR domains from SEQ ID NOs:1-8 described herein.

The antibodies disclosed in the present invention may be modified to be human antibodies which include the constant region from a human germline immunoglobulin sequences. The term "recombinant human antibody" or "chimeric human antibody" includes all human antibodies that are prepared, expressed, created or isolated by recombinant means, such as antibodies isolated from a host cell such as an SP2-0, NS0 or CHO cell (like CHO K1) or from an animal (e.g., a mouse) that is transgenic for human immunoglobulin genes or antibodies or polypeptides expressed using a recombinant expression vector transfected into a host cell. Such recombinant human antibodies have variable and in some embodiments, constant regions derived from human germline immunoglobulin sequences in a rearranged form.

As used herein, the terms "proteins" and "polypeptides" are used interchangeably herein to designate a series of amino acid residues connected to the other by peptide bonds between the alpha-amino and carboxy groups of adjacent residues. The terms "protein" and "polypeptide" refer to a polymer of protein amino acids, including modified amino acids (e.g., phosphorylated, glycated, glycosylated, etc.) and amino acid analogs, regardless of its size or function. "Protein" and "polypeptide" are often used in reference to relatively large polypeptides, whereas the term "peptide" is often used in reference to small polypeptides, but usage of these terms in the art overlaps. The terms "protein" and "polypeptide" are used interchangeably herein when referring to an encoded gene product and fragments thereof. Thus, exemplary polypeptides or proteins include gene products, naturally occurring proteins, homologs, orthologs, paralogs, fragments and other equivalents, variants, fragments, and analogs of the foregoing. The antibodies of the present invention are polypeptides.

In one embodiment, the antibody is selected from the group consisting of a single chain variable fragment (scFv) antibody, an antigen-binding fragment and a chimeric antibody, for example, a humanized antibody (chimeric human antibody).

In some embodiments, provided herein is a chimeric antigen receptor (CAR) including an Ag85B binding domain, derived from the Ag85B-selective antibody, antigen-binding fragment, or svFcs described herein. CARs are fusion proteins that combine a specific antigen-binding peptide with a cell activating receptor. A CAR is a transmembrane protein containing an extracellular portion containing a recognition or binding site for an antigen of interest and a transmembrane and intracellular domain capable of signal transduction to activate the cell (e.g., a lymphocyte). In some embodiments, the CARs described herein may be used to generate BCG Ag85B-specific T cells.

CARs are known in the art and can be made using standard techniques. For example, a suitable CAR includes an Ag85B antibody, antigen-binding fragment, or scFv as described herein joined to a transmembrane and intracellular domain capable of activating the cell (e.g. a lymphocyte). In some embodiments, the CAR includes a scFv selected from SEQ ID NOs:1-8 attached to the transmembrane and intracellular signaling domain. Suitable transmembrane and intracellular signaling domains are known in the art and described herein. In some embodiments, the CAR includes a scFv selected from SEQ ID NOs:1-8 attached to the cytoplasmic region of CD28 from a T cell or a similar region such as 41BB which can provide a T cell with co-stimulation signal necessary to activate the T cell. One can link the Ag85B antibody, antigen-binding fragment, or scFv to an internal signal amplifier such as CD28 or 41BB as would be known by one of skill in the art. Suitable methods of making genetically engineered antigen receptors, and chimeric antigen receptors are known in the art, including, for example, as detailed in Monjezi et al. (Enhanced CAR T-cell engineering using non-viral Sleeping Beauty transposition from minicircle vectors. Leukemia. 2016 Aug. 5. doi: 10.1038/leu.2016.180); Mock et al. (Automated manufacturing of chimeric antigen receptor T cells for adoptive immunotherapy using CliniMACS prodigy. Cytotherapy. 2016 August; 18(8):1002-11. doi: 10.1016/j.jcyt.2016.05.009); Jin et al. (Safe engineering of CAR T cells for adoptive cell therapy of cancer using long-term episomal gene transfer. EMBO Mol Med. 2016 Jul. 1; 8(7):702-11. doi: 10.15252/emmm.201505869); An et al. (Construction of a new anti-CD19 chimeric antigen receptor and the anti-leukemia function study of the transduced T cells. Oncotarget. 2016 Mar. 1; 7(9):10638-49. doi: 10.18632/oncotarget.7079); Ren et al. (Modification of cytokine-induced killer cells with chimeric antigen receptors (CARs) enhances antitumor immunity to epidermal growth factor receptor (EGFR)-positive malignancies, Cancer Immunol Immunother. 2015 December; 64(12):1517-29. doi: 10.1007/s00262-015-1757-6); Oldham et al. (Lentiviral vectors in cancer immunotherapy. Immunotherapy. 2015; 7(3):271-84. doi: 10.2217/imt.14.108); and Urbanska et al. (Targeted cancer immunotherapy via combination of designer bispecific antibody and novel gene-engineered T cells. J Transl Med. 2014 Dec. 13; 12:347. doi:

10.1186/s12967-014-0347-2) the contents of which are incorporated by reference in their entireties.

The transmembrane domain anchors the CAR to the effector cell and functionally links the extracellular domain to the intracellular domain. The transmembrane domain is typically a hydrophobic alpha helix that spans the membrane. Different transmembrane domains result in differential receptor stability. The transmembrane domain of the CAR can include, for example, a CD3ζ polypeptide, a CD4 polypeptide, a CD8 polypeptide, a CD28 polypeptide, a 4-1BB polypeptide, an OX40 polypeptide, an ICOS polypeptide, a CTLA-4 polypeptide, a PD-1 polypeptide, a LAG-3 polypeptide, a 2B4 polypeptide, and a BTLA polypeptide, which are known in the art.

After antigen recognition, the intracellular signaling domain of the CAR transmits an activation signal to the cell (Eshhar, (1993); Altenschmidt (1999)). In some embodiments, the signaling domain is derived from CD3ζ or FcRγ. In certain embodiments, one or more costimulatory domains are included in the intracellular domain to provide improved T cell activation. As used herein, "costimulatory domains" refer to cell surface molecules other than antigen receptors or their ligands that are required for an efficient response of lymphocytes to an antigen. Exemplary costimulatory molecules include a CD28 polypeptide, a CD134 polypeptide, a CD278 polypeptide, a 4-1BB polypeptide (also known as CD137), an OX40 polypeptide, an ICOS polypeptide, a DAP-10 polypeptide, a PD-1 polypeptide, a LAG-3 polypeptide, a 2B4 polypeptide, a BTLA polypeptide, or a CTLA-4 polypeptide. In some embodiments, the intracellular domain of the CAR comprises more than one costimulatory domain.

Engagement of the CAR with its target antigen or cell results in the clustering of the CAR and delivers an activation stimulus to the CAR-containing effector cell. The main characteristic of the CARs is their ability to redirect immune effector cell specificity, thereby triggering proliferation, cytokine production, phagocytosis and production of molecules that can mediate cell death of the target cell in a major histocompatibility (MHC) independent manner, exploiting the cell specific targeting ability of antibodies.

Optionally, a hinge region (also referred to as a spacer region) may be incorporated between the extracellular domain and the transmembrane domain of the CAR, or between the cytoplasmic domain and the transmembrane domain of the CAR. As used herein, a hinge region generally refers to any oligo- or polypeptide that functions to link the transmembrane domain to either the extracellular domain or the cytoplasmic domain in the polypeptide chain. A hinge region may comprise up to 300 amino acids, preferably about 10-100 amino acids, alternatively about 25-50 amino acids. The hinge region may be flexible, for example to allow the antigen binding domain to orient in different directions to facilitate antigen recognition.

Any CARs that are suitable for engineering effector cells (e.g., T cells, NK cells, or NKT cells) for use in adoptive immunotherapy therapy can be used in the present invention. In some embodiments, the CAR includes a scFv described herein, a transmembrane domain, and CD3ζ and 4-1BB intracellular domains.

Suitable methods of making a CAR are described in, for example, US Appl. Publ. No. 2013/0287482, now U.S. Pat. No. 9,499,629, and PCT Appl. Publ. No. WO 2014099671, the contents of which are incorporated by reference in their entireties.

Further embodiments provide an isolated nucleic acid molecule that encodes for the antibodies or antigen binding fragment thereof described above. As used herein, term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); and Rossolini et al., Mol. Cell. Probes 8:91-98 (1994)).

In some embodiments, provided herein is an expression vector that includes a polynucleotide encoding K3-H2, K3-H4, K4-H2, K4-H4, L3-H2, L3-H4, L4-H2, or L4-H4 (e.g., one or more of SEQ ID NOs:1-8). In some embodiments, the polynucleotide encoding K3-H2, K3-H4, K4-H2, K4-H4, L3-H2, L3-H4, L4-H2, or L4-H4 is provided in SEQ ID NOs:30-37 or other degenerate tricodons that yield the same amino acid sequence. In other embodiments, provided herein is an expression vector that encodes a Ag85B antibody comprising a heavy chain variable domain comprising a CDRH1 region selected from the group consisting of SEQ ID NOs:15 and 17, a CDRH2 region selected from the group consisting of the amino acid sequence T and 18, and a CDRH3 region selected from the group consisting of SEQ ID NOs:16 and 19, and a light chain variable domain comprising a CDRL1 region selected from the group consisting of SEQ ID NOs:20, 22, 24, and 27, a CDRL2 region selected from the group consisting of SEQ ID NO:25 and the amino acid sequences YAS, YTS, and GTN, and a CDRH3 region selected from the group consisting of SEQ ID NOs: 21, 23, 26, and 28.

```
SEQ ID NO: 30: Polynucleotide encoding K3-H2
GACATTGTGCTGACACAGTCTCCTGCTTCCTTAGCTGTATCTCTGGGGC

AGAGGGCCACCATCTCATGCAGGGCCAGCCAAAGTGTCAGTACATCTAG

CTATAGTTATATGCACTGGTACCAACAGAAACCAGGACAGCCACCCAAA

CTCCTCATCAAGTATGCATCCAACCTAGAATCTGGGGTCCCTGCCAGGT

TCAGTGGCAGTGGGTCTGGGACAGACTTCACCCTCAACATCCATCCTGT

GGAGGAGGAGGATACTGCAACATATTACTGTCAGCACAGTTGGGAGATT

CCGTACACGTTCGGAGGGGGGACCAAGCTGGAAATAAAAGGCTCCACCT

CTGGATCCGGCAAGCCCGGATCTGGCGAGGGATCCACCAAGGGCATATG

TCCAATGTCCTCTCCACAATCCCTGAAGACACGGACTCTAACTATGGGA

TGGAACTGGATCTTTATTTTAATCCTGTCAGTAACTACAGGTGTCCACT

CTGAGGTCCAGCTGCAGCAGTCTGGACCTGAGCTGGTGAAGCCTGGGGC

TTCAGTGAAGATATCCTGCAAGGCTTCTGGTTACTCATTCACTGGCTAC

TACATGAACTGGGTGAATACTACCTACAACCAGAAGTTCAAGGCCAAGG

CCACATTGACTGTAGACAAATCCTCCAGCACAGCCTACATGCAGCTCAA
```

GAGCCTGACATCTGAGGACTCTGCAGTCTATTACTGTGCAAGACGGAGG

GACTTTGACTACTGGGGCCAAGGCACCACTCTCACAGTCTCCTCAGCCA

AAACGACACCCCCATCTGTCTATCCACTGGCCCCTGGATCTGCTGCCCA

AACTAACTCCATGGTGACCCTGGGATGCCTGGTCAAGGGCTATTTCCCT

GAG

SEQ ID NO: 31: Polynucleotide encoding K3-H4
GACATTGTGCTGACACAGTCTCCTGCTTCCTTAGCTGTATCTCTGGGGC

AGAGGGCCACCATCTCATGCAGGGCCAGCCAAAGTGTCAGTACATCTAG

CTATAGTTATATGCACTGGTACCAACAGAAACCAGGACAGCCACCCAAA

CTCCTCATCAAGTATGCATCCAACCTAGAATCTGGGGTCCCTGCCAGGT

TCAGTGGCAGTGGGTCTGGGACAGACTTCACCCTCAACATCCATCCTGT

GGAGGAGGAGGATACTGCAACATATTACTGTCAGCACAGTTGGGAGATT

CCGTACACGTTCGGAGGGGGGACCAAGCTGGAAATAAAAGGCTCCACCT

CTGGATCCGGCAAGCCCGGATCTGGCGAGGGATCCACCAAGGGCCAGGT

GCAGCTGAAGGAGTCAGGACCTGGCCTGGTGGCGCCCTCACAGAGCCTG

TCCATCACATGCACTGTCTCTGGGTTCTCATTAACCAGCTATGCTATAA

GCTGGGTTCGCCAGCCACCAGGAAAGGGTCTGGAGTGGCTTGGAGTAAT

ATGGACTGGTGGAGGCACAAATTATAATTCAGCTCTCAAATCCAGACTG

AGCATCAGCAAAGACAACTCCAAGAGTCAAGTTTTCTTAAAAATGAACA

GTCTGCAAACTGATGACACAGCCAGGTACTACTGTGCCAGAGGGGGATT

ACGACGGGGGGACTACTTTGACTACTGGGGCCAAGGCACCACTCTCACA

GTCTCCTCA

SEQ ID NO: 32: Polynucleotide encoding K4-H2
ATGAGACCGTCTATTCAGTTCCTGGGGCTCTTGTTGTTCTGGCTTCATG

GTGCTCAGTGTGACATCCAGATGACACAGTCTCCATCCTCACTGTCTGC

ATCTCTGGGAGGCAAAGTCACCATCACTTGCAAGGCAAGCCAAGACATT

AACAAGTATATAGCTTGGTACCAACACAAGCCTGGAAAAGGTCCTAGGC

TGCTCATACATTACACATCTACATTACAGCCAGGCATCCCATCAAGGTT

CAGTGGAAGTGGGTCTGGGAGAGATTATTCCTTCAGCATCAGCAACCTG

GAGCCTGAAGATATTGCAACTTATTATTGTCTACAGTATGATAATCTGT

ACACGTTCGGAGGGGGGACCAAGCTGGAAATAAAAGGCTCCACCTCTGG

ATCCGGCAAGCCCGGATCTGGCGAGGGATCCACCAAGGGCATATGTCCA

ATGTCCTCTCCACAATCCCTGAAGACACGGACTCTAACTATGGGATGGA

ACTGGATCTTTATTTTAATCCTGTCAGTAACTACAGGTGTCCACTCTGA

GGTCCAGCTGCAGCAGTCTGGACCTGAGCTGGTGAAGCCTGGGGCTTCA

GTGAAGATATCCTGCAAGGCTTCTGGTTACTCATTCACTGGCTACTACA

TGAACTGGGTGAATACTACCTACAACCAGAAGTTCAAGGCCAAGGCCAC

ATTGACTGTAGACAAATCCTCCAGCACAGCCTACATGCAGCTCAAGAGC

CTGACATCTGAGGACTCTGCAGTCTATTACTGTGCAAGACGGAGGGACT

TTGACTACTGGGGCCAAGGCACCACTCTCACAGTCTCCTCAGCCAAAAC

GACACCCCCATCTGTCTATCCACTGGCCCCTGGATCTGCTGCCCAAACT

AACTCCATGGTGACCCTGGGATGCCTGGTCAAGGGCTATTTCCCTGAG

SEQ ID NO: 33: polynucleotide encoding K4-H4
ATGAGACCGTCTATTCAGTTCCTGGGGCTCTTGTTGTTCTGGCTTCATG

GTGCTCAGTGTGACATCCAGATGACACAGTCTCCATCCTCACTGTCTGC

ATCTCTGGGAGGCAAAGTCACCATCACTTGCAAGGCAAGCCAAGACATT

AACAAGTATATAGCTTGGTACCAACACAAGCCTGGAAAAGGTCCTAGGC

TGCTCATACATTACACATCTACATTACAGCCAGGCATCCCATCAAGGTT

CAGTGGAAGTGGGTCTGGGAGAGATTATTCCTTCAGCATCAGCAACCTG

GAGCCTGAAGATATTGCAACTTATTATTGTCTACAGTATGATAATCTGT

ACACGTTCGGAGGGGGGACCAAGCTGGAAATAAAAGGCTCCACCTCTGG

ATCCGGCAAGCCCGGATCTGGCGAGGGATCCACCAAGGGCCAGGTGCAG

CTGAAGGAGTCAGGACCTGGCCTGGTGGCGCCCTCACAGAGCCTGTCCA

TCACATGCACTGTCTCTGGGTTCTCATTAACCAGCTATGCTATAAGCTG

GGTTCGCCAGCCACCAGGAAAGGGTCTGGAGTGGCTTGGAGTAATATGG

ACTGGTGGAGGCACAAATTATAATTCAGCTCTCAAATCCAGACTGAGCA

TCAGCAAAGACAACTCCAAGAGTCAAGTTTTCTTAAAAATGAACAGTCT

GCAAACTGATGACACAGCCAGGTACTACTGTGCCAGAGGGGGATTACGA

CGGGGGGACTACTTTGACTACTGGGGCCAAGGCACCACTCTCACAGTCT

CCTCA

SEQ ID NO: 34: Polynucleotide encoding L3-H2
CAACTTGTGCTCACTCAGTCATCTTCAGCCTCTTTCTCCCTGGGAGCCT

CAGCAAAACTCACGTGCACCTTGAGTAGTCAGCACAGTTACACCATTGA

ATGGTATCAGCAACAGCCACTCAAGCCTCCTAAGTATGTGATGGAGCTT

AAGAAAGATGGAAGCCACAGCACAGGTGATGGGATTCCTGATCGCTTCT

CTGGATCCAGCTCTGGTGCTGATCGCTACCTTAGCATTTCCAACATCCA

GCCTGAAGATGAAGCAATATACATCTGTGGTGTGGGTGATACAATTAAG

GAACAATTTGTGTATGTTTTCGGCGGTGGAACCAAGGTCACTGTCCTAG

GCTCCACCTCTGGATCCGGCAAGCCCGGATCTGGCGAGGGATCCACCAA

GGGCATATGTCCAATGTCCTCTCCACAATCCCTGAAGACACGGACTCTA

ACTATGGGATGGAACTGGATCTTTATTTTAATCCTGTCAGTAACTACAG

GTGTCCACTCTGAGGTCCAGCTGCAGCAGTCTGGACCTGAGCTGGTGAA

GCCTGGGGCTTCAGTGAAGATATCCTGCAAGGCTTCTGGTTACTCATTC

ACTGGCTACTACATGAACTGGGTGAATACTACCTACAACCAGAAGTTCA

AGGCCAAGGCCACATTGACTGTAGACAAATCCTCCAGCACAGCCTACAT

GCAGCTCAAGAGCCTGACATCTGAGGACTCTGCAGTCTATTACTGTGCA

AGACGGAGGGACTTTGACTACTGGGGCCAAGGCACCACTCTCACAGTCT

CCTCAGCCAAAACGACACCCCCATCTGTCTATCCACTGGCCCCTGGATC

TGCTGCCCAAACTAACTCCATGGTGACCCTGGGATGCCTGGTCAAGGGC

TATTTCCCTGAG

SEQ ID NO: 35: Polynucleotide encoding L3-H4
CAACTTGTGCTCACTCAGTCATCTTCAGCCTCTTTCTCCCTGGGAGCCT

CAGCAAAACTCACGTGCACCTTGAGTAGTCAGCACAGTTACACCATTGA

ATGGTATCAGCAACAGCCACTCAAGCCTCCTAAGTATGTGATGGAGCTT

AAGAAAGATGGAAGCCACAGCACAGGTGATGGGATTCCTGATCGCTTCT

CTGGATCCAGCTCTGGTGCTGATCGCTACCTTAGCATTTCCAACATCCA

GCCTGAAGATGAAGCAATATACATCTGTGGTGTGGGTGATACAATTAAG

GAACAATTTGTGTATGTTTTCGGCGGTGGAACCAAGGTCACTGTCCTAG

GCTCCACCTCTGGATCCGGCAAGCCCGGATCTGGCGAGGGATCCACCAA

GGGCCAGGTGCAGCTGAAGGAGTCAGGACCTGGCCTGGTGGCGCCCTCA

CAGAGCCTGTCCATCACATGCACTGTCTCTGGGTTCTCATTAACCAGCT

ATGCTATAAGCTGGGTTCGCCAGCCACCAGGAAAGGGTCTGGAGTGGCT

TGGAGTAATATGGACTGGTGGAGGCACAAATTATAATTCAGCTCTCAAA

TCCAGACTGAGCATCAGCAAAGACAACTCCAAGAGTCAAGTTTTCTTAA

AAATGAACAGTCTGCAAACTGATGACACAGCCAGGTACTACTGTGCCAG

AGGGGGATTACGACGGGGGGACTACTTTGACTACTGGGGCCAAGGCACC

ACTCTCACAGTCTCCTCA

SEQ ID NO: 36: Polynucleotide encoding L4-H2
CAGGCTGTTGTGACTCAGGAATCTGCACTCACCACATCACCTGGTGAAA

CAGTCACACTCACTTGTCGCTCAAGTACTGGGGCTGTTACAACTAGTAA

CTATGCCAACTGGGTCCAAGAAAAACCAGATCATTTATTCACTGGTCTA

ATAGGTGGTACCAACAACCGAGCTCCAGGTGTTCCTGCCAGATTCTCAG

GCTCCCTGATTGGAGACAAGGCTGCCCTCACCATCACAGGGGCACAGAC

TGAGGATGAGGCAATATATTTCTGTGCTCTATGGTACAGCAACCATTGG

GTGTTCGGTGGAGGAACCAAACTGACTGTCCTAGGCTCCACCTCTGGAT

CCGGCAAGCCCGGATCTGGCGAGGGATCCACCAAGGGCATATGTCCAAT

GTCCTCTCCACAATCCCTGAAGACACGGACTCTAACTATGGGATGGAAC

TGGATCTTTATTTTAATCCTGTCAGTAACTACAGGTGTCCACTCTGAGG

TCCAGCTGCAGCAGTCTGGACCTGAGCTGGTGAAGCCTGGGGCTTCAGT

GAAGATATCCTGCAAGGCTTCTGGTTACTCATTCACTGGCTACTACATG

AACTGGGTGAATACTACCTACAACCAGAAGTTCAAGGCCAAGGCCACAT

TGACTGTAGACAAATCCTCCAGCACAGCCTACATGCAGCTCAAGAGCCT

GACATCTGAGGACTCTGCAGTCTATTACTGTGCAAGACGGAGGGACTTT

GACTACTGGGGCCAAGGCACCACTCTCACAGTCTCCTCAGCCAAAACGA

CACCCCCATCTGTCTATCCACTGGCCCCTGGATCTGCTGCCCAAACTAA

CTCCATGGTGACCCTGGGATGCCTGGTCAAGGGCTATTTCCCTGAG

SEQ ID NO: 37: Polynucleotide encoding L4-H4
CAGGCTGTTGTGACTCAGGAATCTGCACTCACCACATCACCTGGTGAAA

CAGTCACACTCACTTGTCGCTCAAGTACTGGGGCTGTTACAACTAGTAA

CTATGCCAACTGGGTCCAAGAAAAACCAGATCATTTATTCACTGGTCTA

ATAGGTGGTACCAACAACCGAGCTCCAGGTGTTCCTGCCAGATTCTCAG

GCTCCCTGATTGGAGACAAGGCTGCCCTCACCATCACAGGGGCACAGAC

TGAGGATGAGGCAATATATTTCTGTGCTCTATGGTACAGCAACCATTGG

GTGTTCGGTGGAGGAACCAAACTGACTGTCCTAGGCTCCACCTCTGGAT

CCGGCAAGCCCGGATCTGGCGAGGGATCCACCAAGGGCCAGGTGCAGCT

GAAGGAGTCAGGACCTGGCCTGGTGGCGCCCTCACAGAGCCTGTCCATC

ACATGCACTGTCTCTGGGTTCTCATTAACCAGCTATGCTATAAGCTGGG

TTCGCCAGCCACCAGGAAAGGGTCTGGAGTGGCTTGGAGTAATATGGAC

TGGTGGAGGCACAAATTATAATTCAGCTCTCAAATCCAGACTGAGCATC

AGCAAAGACAACTCCAAGAGTCAAGTTTTCTTAAAAATGAACAGTCTGC

AAACTGATGACACAGCCAGGTACTACTGTGCCAGAGGGGGATTACGACG

GGGGGACTACTTTGACTACTGGGGCCAAGGCACCACTCTCACAGTCTCC

TCA

In some embodiments, the nucleotide or protein sequence comprises conservative or inconsequential substitutions or deletions.

In another embodiment, the invention provides a nucleic acid or nucleic acid construct encoding the CARs disclosed herein. In some embodiments, the nucleic acid or nucleic acid construct encodes a CAR including a scFv described herein, a transmembrane domain, and CD3ζ and 4-1BB intracellular domains. In some embodiments, the nucleic acid encoding the CAR is part of a MSCV-IRES-Thy1.1 (MIT) vector that expresses Thy1.1 as a cell surface marker to identify positively transduced cells.

A recombinant expression cassette comprising a polynucleotide encoding the antibody or antigen binding fragment thereof of the present invention is also contemplated. The polynucleotide may be under the control of a transcriptional promoter allowing the regulation of the transcription of said polynucleotide in a host cell. Said polynucleotide can also be linked to appropriate control sequences allowing the regulation of its translation in a host cell.

In some embodiments, provided herein are expression vectors comprising a polynucleotide encoding the antibodies or fragments of the present invention. Advantageously, the expression vector is a recombinant expression vector comprising an "expression cassette" or an "expression construct" according to the present invention. Within the construct, the polynucleotide may operatively linked to a transcriptional promoter (e.g., a heterologous promoter) allowing the construct to direct the transcription of said polynucleotide in a host cell. Such vectors are referred to herein as "recombinant constructs," "expression constructs," "recombinant expression vectors" (or simply, "expression vectors" or "vectors").

The term "vector" refers to a nucleic acid molecule capable of transporting another nucleic acid to which it has been linked. Vectors, including expression vectors, comprise the nucleotide sequence encoding for the polypeptides described herein and a heterogeneous sequence necessary for proper propagation of the vector and expression of the encoded polypeptide. The heterogeneous sequence is sequence from a difference species than the polypeptide. The heterologous sequence can comprise a heterologous promoter or heterologous transcriptional regulatory region associated with the nucleic acid of the polypeptide that allows for expression of the polypeptide. As used herein, the terms "heterologous promoter," "promoter," "promoter region," or "promoter sequence" refer generally to transcriptional regulatory regions of a gene, which may be found at the 5' or 3' side of the polynucleotides described herein, or within the coding region of the polynucleotides, or within introns in the polynucleotides. Typically, a promoter is a DNA regulatory region capable of binding RNA polymerase in a cell and initiating transcription of a downstream (3' direction) coding sequence. The typical 5' promoter sequence is bounded at its 3' terminus by the transcription initiation site and extends upstream (5' direction) to include the minimum number of bases or elements necessary to initiate transcription at levels detectable above background. Within the promoter sequence is a transcription initiation site, as well as protein binding domains (consensus sequences) responsible for the binding of RNA polymerase.

Suitable vectors are known in the art and contain the necessary elements in order for the gene encoded within the vector to be expressed as a protein in the host cell. One type of vector is a "plasmid", which refers to a circular double stranded DNA loop into which additional DNA segments may be ligated, specifically exogenous DNA segments encoding the antibodies or fragments thereof. Suitable vectors include, but are not limited to, adenovirus, retrovirus, cytomegalovirus (CMV), MMLV, SV40, and the like. Additional preferred operational elements include, but are not limited to, leader sequences, termination codons, polyadenylation signals and any other sequences necessary for the appropriate transcription and expression of the nucleic acid. Suitable expression systems and expression vectors are known in the art and one skilled in the art is able to select an expression vector suitable for the cell chosen. It is understood that the vectors may contain additional elements beneficial for proper protein expression, and are well known in the art. In some embodiments, the vectors will include a selectable marker, e.g. ampicillin resistance and/or fluorescent protein expression (e.g. GFP/RFP), that allows for selection of the transduced and/or transformed cells.

Another type of vector is a viral vector, wherein additional DNA segments may be ligated into the viral genome. Certain vectors are capable of autonomous replication in a host cell into which they are introduced. Other vectors can be integrated into the genome of a host cell upon introduction into the host cell, and thereby are replicated along with the host genome (e.g. lentiviral vectors). Vector includes expression vectors, such as viral vectors (e.g., replication defective retroviruses (including lentiviruses), adenoviruses and adeno-associated viruses (rAAV)), which serve equivalent functions. Lentiviral vectors may be used to make suitable lentiviral vector particles by methods known in the art to transform cells in order to express the antibody or antigen binding fragment thereof described herein.

The present invention also provides a host cell comprising the isolated nucleic acids or expression vectors described herein. In another embodiment, the host cell contains a recombinant expression cassette or a recombinant expression vector according to the present invention and is able to express the encoded antibody or antigen binding fragment thereof. The host cell can be a prokaryotic or eukaryotic host cell. Suitable host cells include, but are not limited to, mammalian cells, bacterial cells and yeast cells. In some embodiments, the host cell may be a eukaryotic cell. The term "host cell" includes a cell into which exogenous nucleic acid has been introduced, including the progeny of such cells. Host cells also include "transformants" and "transformed cells", which include the primary transformed cell and progeny derived therefrom without regard to the number of passages. Progeny may not be completely identical in nucleic acid content to a parent cell, but may contain mutations. Mutant progeny that have the same function or biological activity that was screened or selected for in the originally transformed cell are included herein. It should be appreciated that the host cell can be any cell capable of expressing antibodies, for example fungi; mammalian cells; insect cells, using, for example, a baculovirus expression system; plant cells, such as, for example, corn, rice, *Arabidopsis*, and the like. See, generally, Verma, R. et al., *J Immunol Methods.* 1998 Jul. 1; 216(1-2):165-81. Host cell also include hybridomas that produce the monoclonal antibodies described herein.

In some embodiments, the host cell is a lymphocyte, such as a T cell, a B cell, or a Natural Killer (NK) cell.

In some embodiments, provided herein is a purified and isolated host cells expressing a CAR described herein. The host cell expressing a CAR described herein may be a host cell comprising an expression vector containing an isolated nucleic acid encoding a CAR described herein.

In some embodiments, provided herein is a genetically modified immune effector cells comprising the CARs disclosed herein. Suitable effector cells include T lymphocytes (T cells), natural killer (NK) cells, natural killer T (NKT) cells, B lymphocytes (B cells), and mature immune effector cells including neutrophils and macrophages (which upon administration in a subject differentiate into mature immune effector cells). In preferred embodiments, the effector cell is a lymphocyte. CAR-expressing immune effector cells are capable of killing target cells by effector cell mediated (e.g. T cell-mediated) cell death. In the case of T cell mediated killing, CAR-target binding initiates CAR signaling to the T cell, resulting in activation of a variety of T cell signaling pathways that induce the T cell to produce or release proteins capable of inducing target cell apoptosis by various mechanisms. These T cell mechanisms include, but are not limited to, for example, the transfer of intracellular cytotoxic granules from the T cell into the target cell, T cell secretion of pro-inflammatory cytokines that can induce target cell killing directly or indirectly via recruitment of other killer effector cells, and upregulation of death receptor ligands on the T cell surface that induce target cell apoptosis following binding to their cognate death receptor on the target cell.

In some embodiments, lymphocytes described herein are genetically engineered to express the antibodies described here in or the CAR described herein. As used herein, "genetic engineering" or "genetically engineered" refer to the design and introduction of exogenous or foreign DNA into the lymphocyte by those methods known in the art. The term "transduction" means the introduction of exogenous or foreign DNA into the lymphocyte. Suitable methods of transducing the lymphocytes are known in the art and include, but are not limited to, retroviral transduction, adenoviral or other viral transduction methods, electroporation, transfection using lipofection, calcium phosphate, gene transfer or other procedures known to one skilled in the art, including, for example, as discussed in Sambrook et al. (1989), "Molecular Cloning. A Laboratory Manual," Cold Spring Harbor Press, Plainview, New York, which is incorporated by reference in its entirety. Suitable vectors and kits are commercially available and known to one skilled in the art for expressing an antibody or CAR described herein. Further, genetic engineering also includes any method which employs any number of enzyme systems that one could use to perform gene editing on the receptor and/or vector, and include, but are not limited to, CRISPR/Cas (Clustered regularly interspaced short palindrome repeats (CRISPRs)), CRISPR-associated Zinc-finger nucleases (ZFNs), and transcription-activator-like effector nucleases (TALENs). These are chimeric nucleases composed of programmable, sequence-specific DNA-binding modules linked to a nonspecific DNA cleavage domain. Methods of genetically engineering a cell to express a CAR are known in the art.

In some embodiments, provided herein is a dual-specific lymphocyte that has polyclonal specificity for tumor associated antigens and specificity for BCG antigen Ag85B. Without being bound to any particular theory, method or mode of action, the BCG antigen Ag85B specificity not only breaks the immunosuppression that inhibits lymphocyte mediated cell death, but also drives the expansion and migration of tumor specific lymphocytes to the site of tumors. Suitable dual-specific lymphocyte compositions, constructs, and methods are provided in US Patent Publication No. US 2018/0334651, now U.S. Pat. No. 10,941,381, and PCT Patent Publication No. WO 2017/112184, each of which is incorporated herein by reference in their entirety.

In some embodiments, the present disclosure provides a purified population of dual-specific lymphocytes which have specificity for two or more antigens. The term "dual-specific lymphocytes" refers to lymphocytes that have specificity for at least two different antigens. The dual specific lymphocytes therefore have at least two receptors the bind to two different antigens. In some embodiments, the dual-specific lymphocytes have specificity for at least one tumor associated antigen (TAA) and BCG antigen Ag85B. In some embodiments, the dual-specific lymphocytes may be engineered to have an additional receptor for a second tumor antigen. For example, a dual-specific lymphocyte may have specificity for one TAA and Ag85B, alternatively may have specificity for at least two TAA (e.g. one endogenous TAA and one exogenous TAA genetically engineered into the cell) and Ag85B. Other combinations are also contemplated of at least one TAA and Ag85B.

The present disclosure provides a method of producing an autologous population of dual-specific lymphocytes that can target a plurality of tumor associated antigens and at least one strong antigen. This method comprises the steps of: (a) isolating lymphocytes from a patient; (b) purifying the tumor-specific lymphocytes from the isolated lymphocytes; (c) genetically engineering the purified lymphocytes to express a CAR specific to Ag85B as described herein, wherein the resulting population comprises dual-specific lymphocytes.

The term "autologous" herein refers to lymphocytes that are obtained from the patient to be treated. The term "lymphocyte" herein refers to white blood cells that elicit a cell-mediated immune response. Suitable lymphocytes that may be used include, but are not limited to, CD8+ T cells, CD4+ T cells, natural killer (NK) cells and combinations thereof. In a preferred embodiment, the lymphocytes are CD8+ T cells.

In some embodiments, the lymphocytes are tumor infiltrating lymphocytes (TILs). TILs are white blood cells that have left the bloodstream and migrated into a tumor within a patient. TILs can be a mix of different types of cells (i.e., T cells, B cells, NK cells, macrophages) in variable proportions, although T cells are normally the most prevalent.

Methods of isolating lymphocytes from a patient are known in the art. In some embodiments, the lymphocytes are isolated from tumor tissue excised from the patient. To create the population of cells to use for the genetic manipulation one would harvest the tumor or a portion of the tumor from a patient as a source of lymphocytes or TILs. For example, one can plate fragments of the tumor in cell culture with cytokines to stimulate lymphocyte growth and expansion. In some embodiments, the lymphocytes are isolated from a blood sample from a subject.

In some embodiments, a layer of irradiated feeder lymphocytes is used to support the culture of TILs but other methods such as the addition of conditioned media or support cocktails could be employed. One such example of cytokine conditions used to stimulate lymphocyte growth is the addition of 100 IU/ml of interleukin-2, but other cytokines, growth factors and concentrations can be empirically determined and known by one skilled in the art such as the use of interleukin-7 or interleukin-15. Cultures with strong growth will kill the tumor cells leading to cultures enriched for lymphocytes. Next, the clones of lymphocytes are expanded and tested specifically for their ability to kill the primary tumor in a co-culture system. Those clones which were able to kill the tumor are selected for gene editing to create a dual-specific lymphocytes. These dual-specific lymphocytes can target not just the tumor but also Ag85B.

In some embodiments, provided herein is a composition comprising the isolated Ag85B antibody described herein, an isolated nucleic acid encoding the Ag85B antibody or CAR described herein, or a host cell described herein. In some embodiments, the compositions also includes a suitable carrier, preferably a pharmaceutically acceptable carrier. Compositions are provided that include one or more of the disclosed antibodies. Compositions comprising antibodies or antigen binding fragments thereof that are conjugated to and/or directly or indirectly linked to an agent are also provided. The compositions can be prepared in unit dosage forms for administration to a subject. The amount and timing of administration are at the discretion of the treating clinician to achieve the desired outcome. The antibody can be formulated for systemic or local (such as intravenous, intrathecal) administration.

As used herein, "pharmaceutical composition" means therapeutically effective amounts of the antibody together with a pharmaceutically-acceptable carrier. "Pharmaceutically acceptable" carriers are known in the art and include, but are not limited to, for example, suitable diluents, preservatives, solubilizers, emulsifiers, liposomes, nanoparticles and adjuvants. Pharmaceutically acceptable carriers are well known to those skilled in the art and include, but are not limited to, 0.01 to 0.1 M and preferably 0.05M phosphate buffer or 0.9% saline. Additionally, such pharmaceutically acceptable carriers may be aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include isotonic solutions, alcoholic/aqueous solutions, emulsions or suspensions, including saline and buffered media.

Pharmaceutical compositions of the present disclosure may include liquids or lyophilized or otherwise dried formulations and may include diluents of various buffer content (e.g., Tris-HCl, acetate, phosphate), pH and ionic strength, additives such as albumin or gelatin to prevent absorption to surfaces, detergents (e. g., Tween 20, Tween 80, Pluronic F68, bile acid salts), solubilizing agents (e.g., glycerol, polyethylene glycerol), anti-oxidants (e.g., ascorbic acid, sodium metabisulfite), preservatives (e.g., Thimerosal, benzyl alcohol, parabens), bulking substances or tonicity modifiers (e.g., lactose, mannitol), covalent attachment of polymers such as polyethylene glycol to the protein, complexation with metal ions, or incorporation of the material into or onto particulate preparations of polymeric compounds such as polylactic acid, polyglycolic acid, hydrogels, etc, or onto liposomes, microemulsions, micelles, milamellar or multilamellar vesicles, erythrocyte ghosts, or spheroplasts. Such compositions will influence the physical state, solubility, stability, rate of in vivo release, and rate of in vivo clearance. Controlled or sustained release compositions include formulation in lipophilic depots (e.g., fatty acids, waxes, oils).

In some embodiments, the compositions comprise a pharmaceutically acceptable carrier, for example, buffered saline, and the like. The compositions can be sterilized by conventional, well known sterilization techniques. The compositions may contain pharmaceutically acceptable additional substances as required to approximate physiological conditions such as a pH adjusting and buffering agent, toxicity adjusting agents, such as, sodium acetate, sodium chloride, potassium chloride, calcium chloride, sodium lactate, and the like.

In some embodiments, the antibodies are provided in lyophilized form and rehydrated with sterile water or saline solution before administration. In some embodiments, the antibodies are provided in sterile solution of known concentration. In some embodiments, the antibody composition may be added to an infusion bag containing 0.9% sodium chloride, USP and in some cases, administered in a dosage of from 0.5 to 15 mg/kg of body weight.

In some embodiments, provided herein is a method of treating a patient having cancer and/or a solid tumor, the method comprising administering a therapeutically effective amount of a lymphocyte comprising a Ag85B specific CAR as described herein. Cancers and tumors that may be treated with the Ag85B CAR containing lymphocytes described herein include, but are not limited to, bladder cancer, lung cancer, and melanoma. In some embodiments, provided herein is a method of treating a patient having bladder cancer, the method comprising administering a therapeutically effective amount of a lymphocyte comprising a Ag85B specific CAR as described herein. In some embodiments, provided herein is a method of treating a patient having lung cancer, the method comprising administering a therapeutically effective amount of a lymphocyte comprising a Ag85B specific CAR as described herein. In some embodiments, provided herein is a method of treating a patient having melanoma, the method comprising administering a therapeutically effective amount of a lymphocyte comprising a Ag85B specific CAR as described herein.

Provided herein are methods using a BCG Ag85B antigen to activate the CAR immune cells described herein as a way of treating cancer and tuberculosis infection. Recognition of the BCG Ag85B antigen by the CAR immune cells comprising the Ag85B specific CAR strongly activates the immune cells and elicits are strong are more specific immune response. Subsequent intravessical instillation of BCG, following administration of the CAR immune cells described herein, to the site of the cancer or tuberculosis infection boosts reactivity of the CAR immune cells and breaks the immuno suppressive tumor microenvironment leading to tumor clearance, decreased recurrence, and better outcomes in the models tested.

In some embodiments, provided herein is a method of treating a patient having a tuberculosis infection, the method comprising administering a therapeutically effective amount of a lymphocyte comprising a Ag85B specific CAR as described herein. In some embodiments, provided herein is a method of treating a patient having a drug resistant tuberculosis infection, the method comprising administering a therapeutically effective amount of a lymphocyte comprising a Ag85B specific CAR as described herein.

For purposes of the present invention, "treating" or "treatment" describes the management and care of a subject for the purpose of combating the disease, condition, or disorder. Treating includes the administration of an antibody as described herein or a host cell comprising a CAR as described herein to prevent the onset of the symptoms or complications, alleviating the symptoms or complications, or eliminating the disease, condition, or disorder.

The term "treating" can be characterized by one or more of the following: (a) the reducing, slowing or inhibiting the growth of cancer, including reducing slowing or inhibiting the growth of cancer cells; (b) preventing the further growth of tumors; (c) reducing or preventing the metastasis of cancer within a patient, (d) reducing or ameliorating at least one symptom of the cancer; (e) the reducing, slowing or inhibiting the growth a tuberculosis infection, including reducing slowing or inhibiting the growth of *Mycobacterium* causing the tuberculosis infection; (f) preventing the further growth of *Mycobacterium*; or (g) reducing or ameliorating at least one symptom of a tuberculosis infection. In some embodiments, the optimum effective amounts can be readily determined by one of ordinary skill in the art using routine experimentation.

As used herein, the terms "effective amount" and "therapeutically effective amount" refer to the quantity of active therapeutic agent or agents sufficient to yield a desired therapeutic response without undue adverse side effects such as toxicity, irritation, or allergic response. The specific "effective amount" will, obviously, vary with such factors as the particular condition being treated, the physical condition of the subject, the type of animal being treated, the duration of the treatment, the nature of concurrent therapy (if any), and the specific formulations employed and the structure of the compounds or its derivatives.

In some embodiments, the antibody of the present invention is used for treatment in addition to standard treatment options, for example surgery and radiation therapy. In some embodiments, the antibodies of the present disclosure are used in combination therapy, e.g. therapy including one or more different anti-cancer agents.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, intraaural administration, rectal administration, sublingual administration, buccal administration, and parenteral administration, including injectable such as intravenous administration, intra-arterial administration, intramuscular administration, intradermal administration, intrathecal administration and subcutaneous administration. Administration can be continuous or intermittent. In various aspects, a preparation can be administered therapeutically; that is, administered to treat an existing disease or condition. In a preferred embodiment, the administration is intravenous administration.

In some embodiments, methods of treating a subject with cancer, a solid tumor, a tuberculosis infection, or a drug-resistant tuberculosis infection include obtaining T cells from a patient to be treated. In some embodiments, T cell may be obtained by surgical excision of a tumor and subsequent T cell isolation. Suitable methods for surgical excision and T cell isolation are known in the art. In some embodiments, T cells are obtained from circulating white blood cells by apheresis and subsequent T cell isolation. Suitable methods for apheresis and T cell isolation are known in the art. Following isolation, T cells are activated using standard T cell activation methods known in the art. In some embodiments, T cells are activated by exposure to anti-CD3 and anti-CD28 antibodies. In some embodiments, T cells isolated from circulating white blood cells are activated using autologous dendritic cells loaded with tumor specific antigens or pulsed with tumor antigens. Exposure of the T cells to the autologous dendritic cells will activate tumor specific T cells, with specificity to the tumor antigen carried by the autologous dendritic cell. Following activation, the T cells are expanded in a culture medium including a suitable mixture of cytokines including but not limited to IL-2, IL-7, IL-15, IL-21 or other growth factors. A suitable mixture of cytokines and growth factors is a mixture that supports the in vitro expansion and survival of the activated T cells.

The expanded T cells are than transduced with a BCG Ag85B specific CAR construct to express the Ag85B CAR on the surface of the T cell. Any suitable nucleic acid vector or construct may be used to transduce the T cells. Methods for T cell transduction are known in the art. The T cells comprising the Ag85B specific CAR are then expanded to produce a cell population suitable for immunotherapy treatment of a subject. In some embodiments, the T cells are expanded to produce a cell population including between $0.1 \times 10^6$ and $1 \times 10^9$ CAR T cells. Following transduction or transduction and expansion, the CAR T cells are administered to a subject in need thereof.

CAR T cells may be administered in a dosage between about $0.1 \times 10^6$ and $11 \times 10^8$ CAR T cells/kg body weight of the subject. Suitable dosages for CAR T cell therapies are known in the art. See, for example, Park et al. (Blood 127:3312-3320, 2016) which discloses administration of as many as $11 \times 10^8$ total CAR T cells in clinical trials of CD19 CAR T cell therapies. Various clinical trials have used different cell doses to achieve different clinical effects. The main reasons to adjust cell dose are to increase the anti-tumor killing by the CAR-T cells or to decrease the cell dose to decrease the amount of cytokine release syndrome, a major side effect which causes significant morbidity and mortality during CAR-T treatment. It is therefore important to balance the amount of each effect and there is likely a wide range of appropriate cell doses as demonstrated by the current literature.

In some embodiments, the CAR T cells are administered intravenously. In some embodiments, the CAR T cells are administrated as part of an adoptive transfer procedure. In some embodiments, administration of CAR T cells also includes administration of lymphodepleting drugs including, but not limited to, fludarabine or cyclophosphamide.

In some embodiments, BCG or a BCG vaccine is also administered to a subject in need thereof. BCG or a BCG vaccine may be administrated immediately before, concurrently with, or after administration of the Ag85B specific CAR T cells. In some embodiments, Ag85B specific CAR T cells are administered to a subject and BCG or a BCG vaccine is administered within 12, within 24, within 36, or within 48 hours of the CAR T cell administration.

The subject may be monitored for changes in one or more symptoms of the tuberculosis symptoms, changes in one or more symptoms of the cancer, or for changes in tumor growth and may receive additional CAR T cell and BCG/BCG vaccine treatments as necessary.

In some embodiments, methods of treating a subject with cancer, a solid tumor, a tuberculosis infection, or a drug-resistant tuberculosis infection include obtaining innate lymphocytes. In some embodiments, the innate lymphocytes are autologous innate lymphocytes that may be obtained by any means known in the art, including but not limited to apheresis. In some embodiments, the innate lymphocytes are allogenic. In some embodiments, the innate lymphocytes are from an immortalized cell line, for example, immortalized NK cell line NK-92 (Romanski A, et al. J. cell. Mol. Med. 20(7):1287-94, 2016). In some embodiments, lymphocytes are tumor infiltrating lymphocytes (TILs), and are isolated, for example, from a tumor biopsy sample derived from the subject. The innate lymphocytes (or TILs) are expanded in a culture medium including a suitable mixture of cytokines including but not limited to NKG2D agonist antibody, IL-2, IL-7, IL-15, IL-21 or other growth factors. A suitable mixture of cytokines and growth factors is a mixture that supports the in vitro expansion and survival of the innate lymphocytes.

The innate lymphocytes (or TILs) are then transduced with a nucleic acid encoding a Ag85B specific CAR described herein. In some embodiments, the lymphocytes are transduced using viral transduction and a suitable viral vector. In some embodiments, the lymphocytes are transduced using electroporation (Ingegnere et al. Front. Immunol. (10):957, 2019). The transduced lymphocytes are then expanded in culture prior to administration to the subject.

CAR transduced lymphocytes may be administered in a dosage between about $0.1 \times 10^6$ and $11 \times 10^8$ cells/kg body weight of the subject. In some embodiments, the CAR transduced lymphocytes are administered at a dose of about $1 \times 10^6$ cell/kg body weight of the subject. Suitable dosages for CAR transduced lymphocytes cell therapies are known in the art.

In some embodiments, BCG or a BCG vaccine is also administered to a subject in need thereof. BCG or a BCG vaccine may be administrated immediately before, concurrently with, or after administration of the Ag85B specific CAR transduced lymphocytes. In some embodiments, Ag85B specific CAR transduced lymphocytes are administered to a subject and BCG or a BCG vaccine is administered within 12, within 24, within 36, or within 48 hours of the CAR transduced lymphocyte administration. In some embodiments, the BCG is administered intravessically.

Unless defined otherwise, all technical and scientific terms used herein have the same meaning as commonly understood by one of ordinary skill in the art to which the invention pertains. All definitions, as defined and used herein, should be understood to control over dictionary definitions, definitions in documents incorporated by reference, and/or ordinary meanings of the defined terms.

All references, patents and patent applications disclosed herein are incorporated by reference with respect to the subject matter for which each is cited, which in some cases may encompass the entirety of the document. In addition, any manufacturers' instructions or catalogues for any products cited or mentioned herein are incorporated by reference. Documents incorporated by reference into this text, or any teachings therein, can be used in the practice of the present invention. Documents incorporated by reference into this text are not admitted to be prior art.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Wherever embodiments are described with the language "comprising," otherwise analogous embodiments described in terms of "consisting of" and/or "consisting essentially of" are included.

As used herein, the terms "approximately" or "about" in reference to a number are generally taken to include numbers that fall within a range of 5% in either direction (greater than or less than) the number unless otherwise stated or otherwise evident from the context (except where such number would exceed 100% of a possible value).

Numeric ranges are inclusive of the numbers defining the range, and any individual value provided herein can serve as an endpoint for a range that includes other individual values provided herein. For example, a set of values such as 1, 2, 3, 8, 9, and 10 is also a disclosure of a range of numbers from 1-10, from 1-8, from 3-9, and so forth. Likewise, a disclosed range is a disclosure of each individual value encompassed by the range. For example, a stated range of 5-10 is also a disclosure of 5, 6, 7, 8, 9, and 10.

The present invention has been described in terms of one or more preferred embodiments, and it should be appreciated that many equivalents, alternatives, variations, and modifications, aside from those expressly stated, are possible and within the scope of the invention.

Example 1

The embodiment described in this example demonstrates the design of certain BCG scFv fragments that can be incorporated into standard chimeric antigen receptor (CAR) approaches. In these approaches, one can use the described BCG-specific scFv fragments incorporated into viral CAR constructs (BCG-CAR) that can be used to transduce immune cells. Typical cell types used for the viral transduction include tumor-infiltrating lymphocytes or peripheral blood lymphocytes. T or NK cells are the most common cell type used in current CAR approaches. Standard cell activation motifs are incorporated into CAR technology to allow the cell to become highly activated upon a recognition of BCG antigen by the BCG-specific scFv receptor. Common activation motifs include combinations of CD28 or 4-1BB with CD3ζ. Other activation motifs include OX40, ICOS, or others used by those of skill in the art of CAR technology.

To overcome MHC-restriction in TCR meditated antigen (epitope) recognition, we attempted to design a chimeric antigen receptor (CAR) that recognized a natural BCG antigen—Ag85B. Ag85B is one of the most abundantly produced antigens by BCG. It has been shown to interact with fibronectin on the urinary epithelia cells during BCG instillation in bladder cancer patients. To do this, we first immunized the C57BL/6 mice with $1\times10^6$ CFU of BCG intraperitoneally (i.p.) followed by two boosters with the same dose on weeks 3 and 6 respectively. Next, germinal center B cells from spleens were isolated by Ag85B tetramer. Next, cDNA libraries were constructed from Ag85B tetramer$^+$ B cells and B cell receptors (BCRs) were amplified and subjected to parallel sequencing. Among ~300 identified heavy chains and light chains (both lambda and kappa), we chose the most predominant heavy chains and light chains (FIG. 2) to generate 8 single-chain variable fragments (scFvs). We then constructed CAR vectors with one of each of these scFvs, a transmembrane domain, CD3ζ and 4-1BB intracellular domains into a MSCV-IRES-Thy1.1 (MIT) vector that expresses Thy1.1 as a cell surface marker to identify positively transduced cells (FIG. 1).

Figures 3A, 3B:
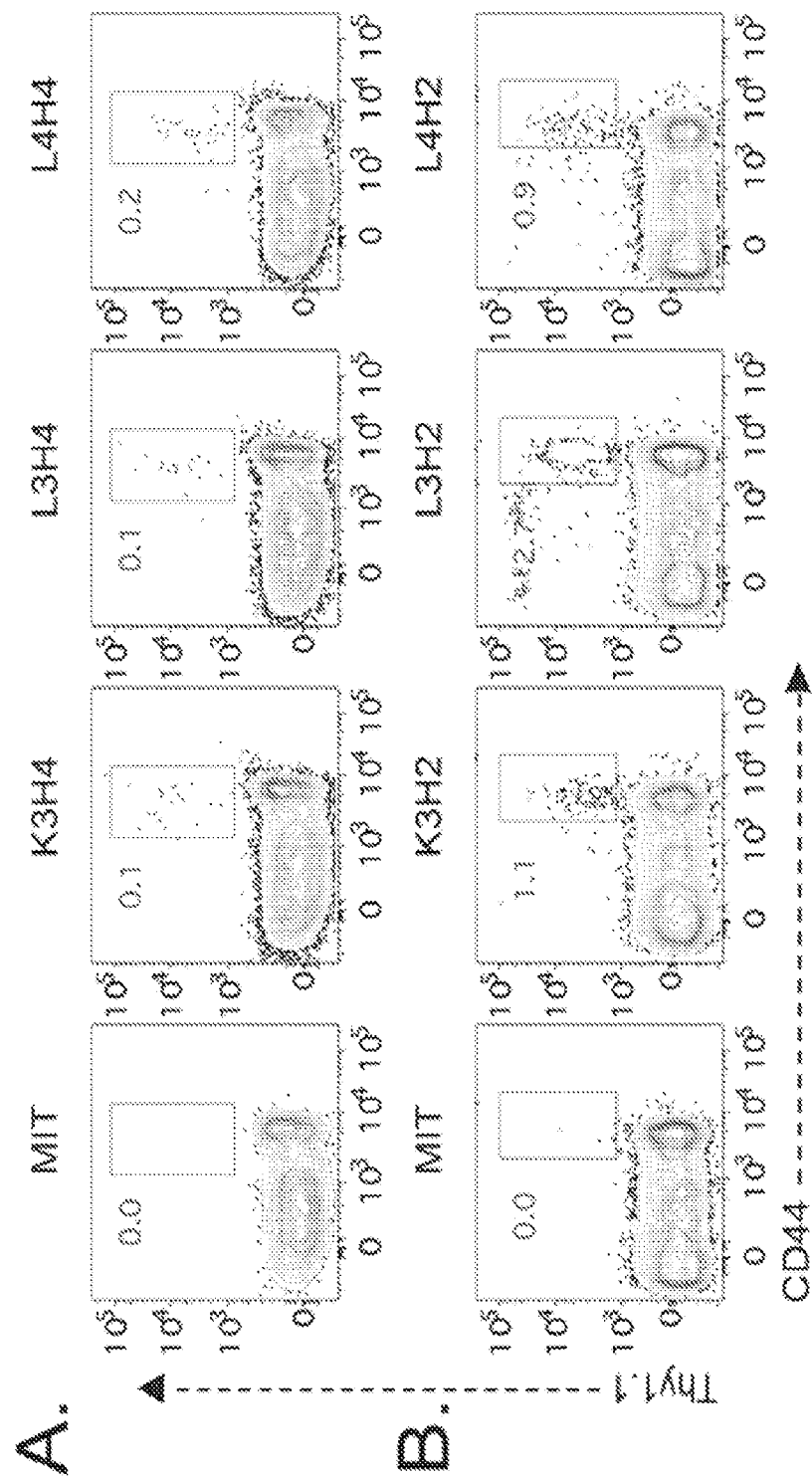
FIGS. 3A-3B show data demonstrating the reactivity of BCG-specific CAR constructs with BCG antigen Ag85B. Based on different scFvs antigen-recognition domains, six BCG-CAR retroviral vectors (RV) were generated and used to transduce activated CD8 T cells. These CD8 T cells were then transferred to naïve C57BL/6 mice followed by i.p. BCG immunization. Two weeks later, the frequency of transferred T cells in the peripheral blood were examined by flow cytometry. Data shown are two independent experiments.

Next, we used these BCG-CAR retroviral vectors (RVs) to transduce in vitro activated CD8 T cells, FACS sorted Thy1.1$^+$ RV transduced CD8 T cells and adoptively transferred into naïve congenic C57BL/6 mice. We then vaccinated these chimeric mice with BCG i.p. and tracked the T cell response in the peripheral blood. Data shown in FIGS. 3A-3B represent two of these screening experiments. By far, we have successfully selected one clone (L3H2) with the most robust T cell response (FIG. 3B). In this embodiment, we will use this vector, referred to as BCG-CAR.

To validate if BCG-CAR transduced T cells can sufficiently respond to BCG instilled into the bladder, we performed a pilot experiment by inoculating $2\times10^5$ MB49 cells in the bladder to establish tumor as described previously. (Chen, F., Zhang, G., Cao, Y., Hessner, M. J. & See, W. A. MB49 murine urothelial carcinoma: molecular and phenotypic comparison to human cell lines as a model of the direct tumor response to bacillus Calmette-Guerin. *J Urol* 182, 2932-2937 (2009), incorporated herein by reference in its entirety).

Figures 4A, 4B:
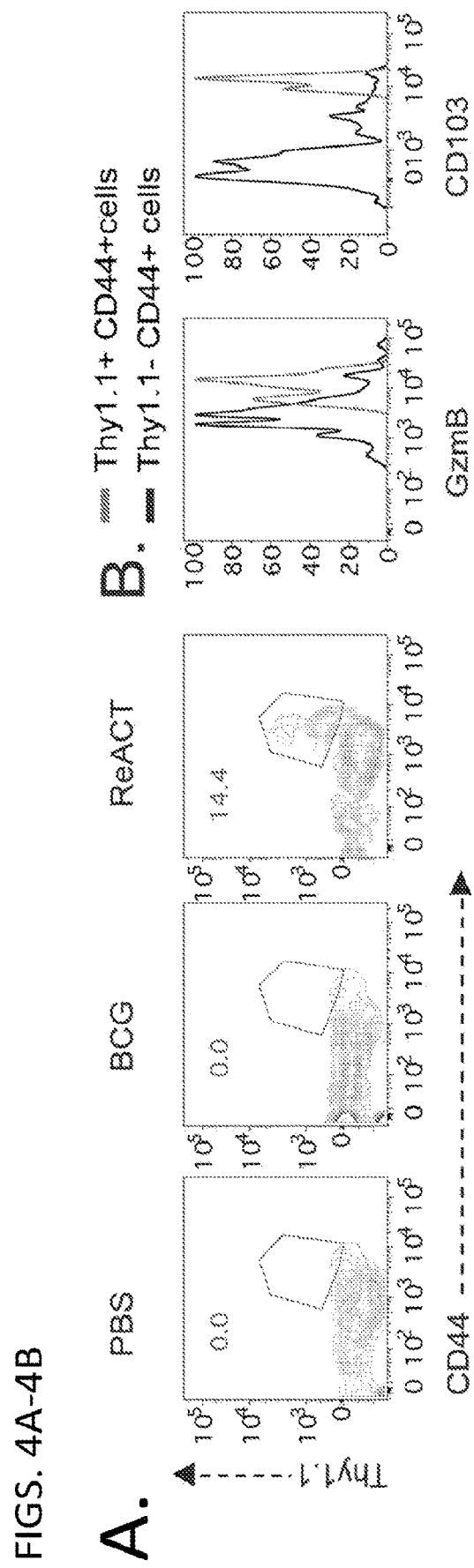
FIGS. 4A-4B show BCG-CAR$^+$ CD8 T cells were detected as early as day 6 post intravesical instillation. More importantly, these CD8 T cells expressed high levels of CD103 and granzyme B, suggesting that they were tissue-infiltrating effector T cells. This pilot study shows the feasibility of BCG-CAR based ReACT therapy in bladder cancer. C57BL/6 mice were orthotopically implanted with MB49-Luc cells. One week later, these mice received the following treatments: PBS, BCG and ReACT. For ReACT, the tumor and BCG dual-specific CD8 T cells were created by in vitro priming with MB49 cell lysate fed DC and transduction with BCG-CAR RV. The BCG-CAR T cells were transferred to tumor bearing mice followed by intravesical instillation of BCG. After 6 days, the frequency of dual-specific T cells isolated from bladders was examined and shown in FIG. 4A. Their effector phenotypes were evaluated by expression of CD103 and granzyme B (FIG. 4B).

One week later, we adoptively transferred $1\times10^6$ of the L3H2 BCG-CAR transduced T cells intravenously (i.v.). Simultaneously, we administered BCG via intraurethral instillation ($3\times10^6$ CFU/mouse). Bladder tissues were harvested and examined for BCG-CAR$^+$ CD8 T cells. As shown in FIG. 4A, BCG-CAR$^+$ CD8 T cells were detected as early as day 6 post intravesical instillation. More importantly, these CD8 T cells expressed high levels of CD103 and granzyme B, suggesting that they were tissue-infiltrating effector T cells (FIG. 4B).

Example 2

Figure 5A:
FIGS. 5A-5B. Pilot study 2 demonstrates the feasibility of ReACT therapy in bladder cancer. C57BL/6 mice were orthotopically implanted with MB49-Luc cells followed by weekly bioluminescence imaging (BLI). Polyclonal dual-specific CD8 CAR T cells were created by MB49-Luc cell lysate pulsed DC priming and BCG-CAR RV transduction. Positively transduced T cells were FACS sorted by Thy1.1 expression and used for ACT and ReACT. One day after inoculation, four groups of tumor-bearing mice received different treatment regiments including: PBS, BCG, ACT of BCG-CAR T cells and ReACT (BCG-CAR T cells+BCG). (A) Bladder tumor burden was visualized by serial BLI images of a representative mouse taken up to 36 days after treatment. (B) The survival of four treatment groups of mice over time.

A second pilot study shows the feasibility of ReACT therapy in bladder cancer: To test if ReACT therapy with BCG-CAR transduced T cells can sufficiently control bladder cancer, we have performed a pilot experiment. We first inoculated $2\times10^5$ MB49-Luc cells in the bladder to establish orthotopic tumor. Tumor bearing mice were followed by weekly non-invasive bioluminescent imaging (BLI) to monitor the tumor growth. The MB49-Luc implanted mouse model and BCG instillation are routinely performed as evidenced by previous publications. (Chen, F., Zhang, G., Cao, Y., Hessner, M. J. & See, W. A. MB49 murine urothelial carcinoma: molecular and phenotypic comparison to human cell lines as a model of the direct tumor response to bacillus Calmette-Guerin. *J Urol* 182, 2932-2937 (2009); Zhang, G., Chen, F., Cao, Y., Johnson, B. & See, W. A. HMGB1 release by urothelial carcinoma cells is required for the in vivo antitumor response to Bacillus Calmette-Guerin. *J Urol* 189, 1541-1546 (2013), incorporated herein by reference in its entirety). The tumor burden, as monitored by BLI, is shown in a representative mouse (FIG. 5A). To demonstrate the proof-of-concept, we used MB49-Luc cell lysate-pulsed DCs to stimulate naïve CD8 T cells to differentiate them into effector cytotoxic T lymphocytes (CTLs) that recognize various MB49-Luc derived tumor antigens as shown in our previous work (Liang, X. et al. beta-catenin mediates tumor-induced immunosuppression by inhibiting cross-priming of CD8(+) T cells. *J Leukoc Biol* 95, 179-190 (2014); Xin, G. et al. Pathogen boosted adoptive cell transfer immunotherapy to treat solid tumors. *Proc Natl Acad Sci USA* 114, 740-745 (2017), both of which are incorporated herein by reference in their entirety).

Next, we transduced these CTLs with L3H2 BCG-CAR RV to create dual-specific CD8 T cells as described in FIG. 1A. We then performed ReACT therapy in MB49-Luc induced bladder cancer mice by adoptively transferring $1 \times 10^6$ of BCG-CAR transduced T cells intravenously (i.v.) and simultaneously administering BCG via intraurethral instillation ($3 \times 10^6$ CFU/mouse). The control groups include 1) PBS; 2) BCG; and 3) L3H2 BCG-CAR T cell adoptive transfer alone.

Figure 5B:
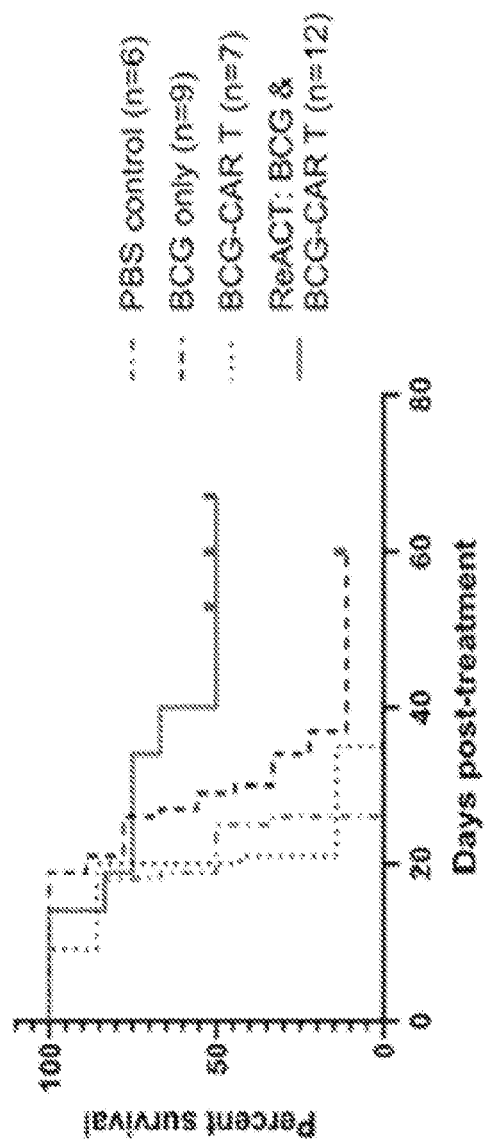

As expected, all mice showed detectable luminescence signals in the first two weeks, which indicated successful tumor induction (data not shown). Remarkably, the combination of L3H2 BCG-CAR T cell transfer and BCG instillation led to sustained disease remission in 70% of the treatment cohort (complete remission: 50%; partial remission: 20%) compared to uncontrolled tumor growth and subsequent disease-related mortality in all control subjects. FIG. 5A depicts serial imaging of a mouse from the treatment cohort demonstrating sustained disease cure. This therapeutic effect was associated with improved overall survival (FIG. 5B). By contrast, the other three treatment groups exhibited only modest antitumor effects and survival benefit (FIG. 5B). Taken together, these results demonstrate the feasibility of using BCG-CAR mediated ReACT to treat bladder cancer.

I claim:

1. An isolated antibody or antigen binding fragment thereof capable of binding Bacillus Calmette-Guerin (BCG) antigen Ag85B comprising:

a light chain variable domain selected from the group consisting of (i) a light chain variable domain comprising a CDRL1 region of SEQ ID NO:20, a CDRL2 region of the amino acid sequence YAS, and a CDRL3 region of SEQ ID NO:21; (ii) a light chain variable domain comprising a CDRL1 region of SEQ ID NO:22, a CDRL2 region of the amino acid sequence YTS, and a CDRL3 region of SEQ ID NO:23; (iii) a light chain variable domain comprising a CDRL1 region of SEQ ID NO:24, a CDRL2 region of SEQ ID NO:25, and a CDRL3 region of SEQ ID NO:26; and (iv) a light chain variable domain comprising a CDRL1 region of SEQ ID NO: 27, a CDRL2 region of the amino acid sequence GTN, and a CDRL3 region of SEQ ID NO: 28; and a heavy chain variable domain selected from the group consisting of a heavy chain variable domain comprising a CDRH1 region of SEQ ID NO:15, a CDRH2 region of the amino acid sequence T, and a CDRH3 region of SEQ ID NO:16; and a heavy chain variable domain comprising a CDRH1 region of SEQ ID NO:17, a CDRH2 region of SEQ ID NO:18, and a CDRH3 region of SEQ ID NO: 19.

2. The isolated antibody or antigen fragment thereof of claim 1, wherein the antibody or fragment there of comprises a heavy and a light chain selected from the group consisting of:
  (a) a light chain comprising SEQ ID NO:11 or a sequence with at least 85% similarity to SEQ ID NO:11, and a heavy chain comprising SEQ ID NO:9 or a sequence with at least 85% similarity to SEQ ID NO:9;
  (b) a light chain comprising SEQ ID NO:11 or a sequence with at least 85% similarity to SEQ ID NO:11, and a heavy chain comprising SEQ ID NO: 10 or a sequence with at least 85% similarity to SEQ ID NO:10;
  (c) a light chain comprising SEQ ID NO:12 or a sequence with at least 85% similarity to SEQ ID NO:12, and a heavy chain comprising SEQ ID NO:9 or a sequence with at least 85% similarity to SEQ ID NO:9;
  (d) a light chain comprising SEQ ID NO:12 or a sequence with at least 85% similarity to SEQ ID NO:12, and a heavy chain comprising SEQ ID NO:10 or a sequence with at least 85% similarity to SEQ ID NO:10;
  (e) a light chain comprising SEQ ID NO:13 or a sequence with at least 85% similarity to SEQ ID NO:13, and a heavy chain comprising SEQ ID NO:9 or a sequence with at least 85% similarity to SEQ ID NO:9;
  (f) a light chain comprising SEQ ID NO:13 or a sequence with at least 85% similarity to SEQ ID NO:13, and a heavy chain comprising SEQ ID NO: 10 or a sequence with at least 85% similarity to SEQ ID NO:10;
  (g) a light chain comprising SEQ ID NO:14 or a sequence with at least 85% similarity to SEQ ID NO:14, and a heavy chain comprising SEQ ID NO:9 or a sequence with at least 85% similarity to SEQ ID NO:9; and
  (h) a light chain comprising SEQ ID NO:14 or a sequence with at least 85% similarity to SEQ ID NO:14, and a heavy chain comprising SEQ ID NO: 10 or a sequence with at least 85% similarity to SEQ ID NO:10.

3. The isolated antibody or antigen binding fragment thereof of claim 1, wherein the antibody or antigen binding fragment thereof is a single chain variable fragment (scFv).

4. The isolated antibody or antigen fragment of claim 3, wherein the single chain variable fragment comprises a sequence selected from the group consisting of SEQ ID NOs: 1-8.

5. A nucleic acid molecule encoding the antibody or antigen binding fragment thereof of claim 1.

6. A chimeric antigen receptor comprising the antibody or antigen binding fragment thereof of claim 1, a transmembrane domain, and an intracellular signaling domain.

7. The chimeric antigen receptor of claim 6, wherein the intracellular signaling domain is selected from the group consisting of CD3ζ, FcRy, CD28, CD134, CD278, 4-IBB, OX40, ICOS, DAP-10, PD-1, LAG-3, 2B4, BTLA, CTLA-4, and combinations thereof.

8. The chimeric antigen receptor of claim 7, wherein the intracellular signaling domain comprises CD33 and 4-IBB.

9. A nucleic acid encoding the chimeric antigen receptor of claim 6.

10. An expression vector comprising the nucleic acid of claim 9.

11. A cell comprising the chimeric antigen receptor of claim 6.

12. The cell of claim 11, wherein the cell is a T cell, a B cell, a Natural Killer (NK) cell, a lymphocyte, a neutrophil or a macrophage.

13. A composition comprising a lymphocyte of claim 12 and a pharmaceutically acceptable carrier.

14. A method of treating cancer in a subject in need thereof comprising administering to the subject a therapeutically effective amount of the composition of claim 13; and
  administering to the subject a therapeutically effective amount of a composition comprising Bacillus Calmette-Guerin (BCG) antigen Ag85B.

15. The method of claim 14, wherein the lymphocyte composition is administered intravenously.

16. The method of claim 14, wherein the composition comprising BCG antigen Ag85B is a BCG vaccine.

17. The method of claim 14, wherein the cancer is bladder cancer, lung cancer, or melanoma.

18. The method of claim 14, wherein the BCG antigen Ag85B composition is administered to the subject no more than 48 hours after administration of the lymphocyte composition.

19. A method of treating tuberculosis infection in a subject in need thereof comprising
  administering to the subject a therapeutically effective amount of the composition of claim 13.

20. The method of claim 19, wherein the composition is administered intravenously.

* * * * *

SEQUENCE LISTING

<160> NUMBER OF SEQ ID NOS: 37

<210> SEQ ID NO 1
<211> LENGTH: 295
<212> TYPE: PRT
<213> ORGANISM: Mus musculus

<400> SEQUENCE: 1

```
Asp Ile Val Leu Thr Gln Ser Pro Ala Ser Leu Ala Val Ser Leu Gly
1               5                   10                  15

Gln Arg Ala Thr Ile Ser Cys Arg Ala Ser Gln Ser Val Ser Thr Ser
            20                  25                  30

Ser Tyr Ser Tyr Met His Trp Tyr Gln Gln Lys Pro Gly Gln Pro Pro
        35                  40                  45

Lys Leu Leu Ile Lys Tyr Ala Ser Asn Leu Glu Ser Gly Val Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Thr Ala Thr Tyr Tyr Cys Gln His Ser Trp
                85                  90                  95

Glu Ile Pro Tyr Thr Phe Gly Gly Gly Thr Lys Leu Glu Ile Lys Gly
            100                 105                 110

Ser Thr Ser Gly Ser Gly Lys Pro Gly Ser Gly Glu Gly Ser Thr Lys
        115                 120                 125

Gly Ile Cys Pro Met Ser Ser Pro Gln Ser Leu Lys Thr Arg Thr Leu
    130                 135                 140

Thr Met Gly Trp Asn Trp Ile Phe Ile Leu Ile Leu Ser Val Thr Thr
145                 150                 155                 160

Gly Val His Ser Glu Val Gln Leu Gln Gln Ser Gly Pro Glu Leu Val
                165                 170                 175

Lys Pro Gly Ala Ser Val Lys Ile Ser Cys Lys Ala Ser Gly Tyr Ser
            180                 185                 190

Phe Thr Gly Tyr Tyr Met Asn Trp Val Asn Thr Thr Tyr Asn Gln Lys
        195                 200                 205

Phe Lys Ala Lys Ala Thr Leu Thr Val Asp Lys Ser Ser Ser Thr Ala
    210                 215                 220
```

Tyr Met Gln Leu Lys Ser Leu Thr Ser Glu Asp Ser Ala Val Tyr Tyr
225                 230                 235                 240

Cys Ala Arg Arg Arg Asp Phe Asp Tyr Trp Gly Gln Gly Thr Thr Leu
            245                 250                 255

Thr Val Ser Ser Ala Lys Thr Thr Pro Pro Ser Val Tyr Pro Leu Ala
        260                 265                 270

Pro Gly Ser Ala Ala Gln Thr Asn Ser Met Val Thr Leu Gly Cys Leu
        275                 280                 285

Val Lys Gly Tyr Phe Pro Glu
        290             295

<210> SEQ ID NO 2
<211> LENGTH: 248
<212> TYPE: PRT
<213> ORGANISM: Mus musculus

<400> SEQUENCE: 2

Asp Ile Val Leu Thr Gln Ser Pro Ala Ser Leu Ala Val Ser Leu Gly
1               5                   10                  15

Gln Arg Ala Thr Ile Ser Cys Arg Ala Ser Gln Ser Val Ser Thr Ser
            20                  25                  30

Ser Tyr Ser Tyr Met His Trp Tyr Gln Gln Lys Pro Gly Gln Pro Pro
        35                  40                  45

Lys Leu Leu Ile Lys Tyr Ala Ser Asn Leu Glu Ser Gly Val Pro Ala
    50                  55                  60

Arg Phe Ser Gly Ser Gly Ser Gly Thr Asp Phe Thr Leu Asn Ile His
65                  70                  75                  80

Pro Val Glu Glu Glu Asp Thr Ala Thr Tyr Tyr Cys Gln His Ser Trp
                85                  90                  95

Glu Ile Pro Tyr Thr Phe Gly Gly Gly Thr Lys Leu Glu Ile Lys Gly
            100                 105                 110

Ser Thr Ser Gly Ser Gly Lys Pro Gly Ser Gly Glu Gly Ser Thr Lys
        115                 120                 125

Gly Gln Val Gln Leu Lys Glu Ser Gly Pro Gly Leu Val Ala Pro Ser
130                 135                 140

Gln Ser Leu Ser Ile Thr Cys Thr Val Ser Gly Phe Ser Leu Thr Ser
145                 150                 155                 160

Tyr Ala Ile Ser Trp Val Arg Gln Pro Pro Gly Lys Gly Leu Glu Trp
                165                 170                 175

Leu Gly Val Ile Trp Thr Gly Gly Thr Asn Tyr Asn Ser Ala Leu
            180                 185                 190

Lys Ser Arg Leu Ser Ile Ser Lys Asp Asn Ser Lys Ser Gln Val Phe
        195                 200                 205

Leu Lys Met Asn Ser Leu Gln Thr Asp Asp Thr Ala Arg Tyr Tyr Cys
210                 215                 220

Ala Arg Gly Gly Leu Arg Arg Gly Asp Tyr Phe Asp Tyr Trp Gly Gln
225                 230                 235                 240

Gly Thr Thr Leu Thr Val Ser Ser
                245

<210> SEQ ID NO 3
<211> LENGTH: 317
<212> TYPE: PRT
<213> ORGANISM: Mus musculus

<400> SEQUENCE: 3

```
Met Arg Pro Ser Ile Gln Phe Leu Gly Leu Leu Phe Trp Leu His
1               5                   10                  15

Gly Ala Gln Cys Asp Ile Gln Met Thr Gln Ser Pro Ser Ser Leu Ser
            20                  25                  30

Ala Ser Leu Gly Gly Lys Val Thr Ile Thr Cys Lys Ala Ser Gln Asp
        35                  40                  45

Ile Asn Lys Tyr Ile Ala Trp Tyr Gln His Lys Pro Gly Lys Gly Pro
    50                  55                  60

Arg Leu Leu Ile His Tyr Thr Ser Thr Leu Gln Pro Gly Ile Pro Ser
65                  70                  75                  80

Arg Phe Ser Gly Ser Gly Ser Gly Arg Asp Tyr Ser Phe Ser Ile Ser
                85                  90                  95

Asn Leu Glu Pro Glu Asp Ile Ala Thr Tyr Tyr Cys Leu Gln Tyr Asp
            100                 105                 110

Asn Leu Tyr Thr Phe Gly Gly Gly Thr Lys Leu Glu Ile Lys Gly Ser
        115                 120                 125

Thr Ser Gly Ser Gly Gly Ser Thr Gly Ser Gly Lys Pro Gly Ser
        130                 135                 140

Gly Glu Gly Ser Thr Lys Gly Ile Cys Pro Met Ser Ser Pro Gln Ser
145                 150                 155                 160

Leu Lys Thr Arg Thr Leu Thr Met Gly Trp Asn Trp Ile Phe Ile Leu
                165                 170                 175

Ile Leu Ser Val Thr Thr Gly Val His Ser Glu Val Gln Leu Gln Gln
            180                 185                 190

Ser Gly Pro Glu Leu Val Lys Pro Gly Ala Ser Val Lys Ile Ser Cys
        195                 200                 205

Lys Ala Ser Gly Tyr Ser Phe Thr Gly Tyr Tyr Met Asn Trp Val Asn
    210                 215                 220

Thr Thr Tyr Asn Gln Lys Phe Lys Ala Lys Ala Thr Leu Thr Val Asp
225                 230                 235                 240

Lys Ser Ser Ser Thr Ala Tyr Met Gln Leu Lys Ser Leu Thr Ser Glu
                245                 250                 255

Asp Ser Ala Val Tyr Tyr Cys Ala Arg Arg Asp Phe Asp Tyr Trp
            260                 265                 270

Gly Gln Gly Thr Thr Leu Thr Val Ser Ser Ala Lys Thr Thr Pro Pro
        275                 280                 285

Ser Val Tyr Pro Leu Ala Pro Gly Ser Ala Ala Gln Thr Asn Ser Met
    290                 295                 300

Val Thr Leu Gly Cys Leu Val Lys Gly Tyr Phe Pro Glu
305                 310                 315

<210> SEQ ID NO 4
<211> LENGTH: 270
<212> TYPE: PRT
<213> ORGANISM: Mus musculus

<400> SEQUENCE: 4

Met Arg Pro Ser Ile Gln Phe Leu Gly Leu Leu Phe Trp Leu His
1               5                   10                  15

Gly Ala Gln Cys Asp Ile Gln Met Thr Gln Ser Pro Ser Ser Leu Ser
            20                  25                  30

Ala Ser Leu Gly Gly Lys Val Thr Ile Thr Cys Lys Ala Ser Gln Asp
        35                  40                  45

Ile Asn Lys Tyr Ile Ala Trp Tyr Gln His Lys Pro Gly Lys Gly Pro
```

-continued

```
                50                  55                  60
Arg Leu Leu Ile His Tyr Thr Ser Thr Leu Gln Pro Gly Ile Pro Ser
 65                  70                  75                  80

Arg Phe Ser Gly Ser Gly Ser Gly Arg Asp Tyr Ser Phe Ser Ile Ser
                 85                  90                  95

Asn Leu Glu Pro Glu Asp Ile Ala Thr Tyr Tyr Cys Leu Gln Tyr Asp
            100                 105                 110

Asn Leu Tyr Thr Phe Gly Gly Gly Thr Lys Leu Glu Ile Lys Gly Ser
        115                 120                 125

Thr Ser Gly Ser Gly Gly Ser Thr Ser Gly Ser Gly Lys Pro Gly Ser
130                 135                 140

Gly Glu Gly Ser Thr Lys Gly Gln Val Gln Leu Lys Glu Ser Gly Pro
145                 150                 155                 160

Gly Leu Val Ala Pro Ser Gln Ser Leu Ser Ile Thr Cys Thr Val Ser
                165                 170                 175

Gly Phe Ser Leu Thr Ser Tyr Ala Ile Ser Trp Val Arg Gln Pro Pro
            180                 185                 190

Gly Lys Gly Leu Glu Trp Leu Gly Val Ile Trp Thr Gly Gly Gly Thr
        195                 200                 205

Asn Tyr Asn Ser Ala Leu Lys Ser Arg Leu Ser Ile Ser Lys Asp Asn
210                 215                 220

Ser Lys Ser Gln Val Phe Leu Lys Met Asn Ser Leu Gln Thr Asp Asp
225                 230                 235                 240

Thr Ala Arg Tyr Tyr Cys Ala Arg Gly Gly Leu Arg Arg Gly Asp Tyr
                245                 250                 255

Phe Asp Tyr Trp Gly Gln Gly Thr Thr Leu Thr Val Ser Ser
            260                 265                 270

<210> SEQ ID NO 5
<211> LENGTH: 298
<212> TYPE: PRT
<213> ORGANISM: Mus musculus

<400> SEQUENCE: 5

Gln Leu Val Leu Thr Gln Ser Ser Ser Ala Ser Phe Ser Leu Gly Ala
 1               5                  10                  15

Ser Ala Lys Leu Thr Cys Thr Leu Ser Ser Gln His Ser Tyr Thr Ile
                20                  25                  30

Glu Trp Tyr Gln Gln Pro Leu Lys Pro Pro Lys Tyr Val Met Glu
            35                  40                  45

Leu Lys Lys Asp Gly Ser His Ser Thr Gly Asp Gly Ile Pro Asp Arg
        50                  55                  60

Phe Ser Gly Ser Ser Gly Ala Asp Arg Tyr Leu Ser Ile Ser Asn
 65                  70                  75                  80

Ile Gln Pro Glu Asp Glu Ala Ile Tyr Ile Cys Gly Val Gly Asp Thr
                 85                  90                  95

Ile Lys Glu Gln Phe Val Tyr Val Phe Gly Gly Gly Thr Lys Val Thr
            100                 105                 110

Val Leu Gly Ser Thr Ser Gly Ser Gly Lys Pro Gly Ser Gly Glu Gly
        115                 120                 125

Ser Thr Lys Gly Ile Cys Pro Met Ser Ser Pro Gln Ser Leu Lys Thr
130                 135                 140

Arg Thr Leu Thr Met Gly Trp Asn Trp Ile Phe Ile Leu Ile Leu Ser
145                 150                 155                 160
```

```
Val Thr Thr Gly Val His Ser Glu Val Gln Leu Gln Gln Ser Gly Pro
            165                 170                 175

Glu Leu Val Lys Pro Gly Ala Ser Val Lys Ile Ser Cys Lys Ala Ser
            180                 185                 190

Gly Tyr Ser Phe Thr Gly Tyr Tyr Met Asn Trp Val Asn Thr Thr Tyr
            195                 200                 205

Asn Gln Lys Phe Lys Ala Lys Ala Thr Leu Thr Val Asp Lys Ser Ser
            210                 215                 220

Ser Thr Ala Tyr Met Gln Leu Lys Ser Leu Thr Ser Glu Asp Ser Ala
225                 230                 235                 240

Val Tyr Tyr Cys Ala Arg Arg Arg Asp Phe Asp Tyr Trp Gly Gln Gly
            245                 250                 255

Thr Thr Leu Thr Val Ser Ser Ala Lys Thr Thr Pro Pro Ser Val Tyr
            260                 265                 270

Pro Leu Ala Pro Gly Ser Ala Ala Gln Thr Asn Ser Met Val Thr Leu
            275                 280                 285

Gly Cys Leu Val Lys Gly Tyr Phe Pro Glu
            290                 295

<210> SEQ ID NO 6
<211> LENGTH: 251
<212> TYPE: PRT
<213> ORGANISM: Mus musculus

<400> SEQUENCE: 6

Gln Leu Val Leu Thr Gln Ser Ser Ser Ala Ser Phe Ser Leu Gly Ala
1               5                   10                  15

Ser Ala Lys Leu Thr Cys Thr Leu Ser Ser Gln His Ser Tyr Thr Ile
            20                  25                  30

Glu Trp Tyr Gln Gln Gln Pro Leu Lys Pro Pro Lys Tyr Val Met Glu
            35                  40                  45

Leu Lys Lys Asp Gly Ser His Ser Thr Gly Asp Gly Ile Pro Asp Arg
    50                  55                  60

Phe Ser Gly Ser Ser Ser Gly Ala Asp Arg Tyr Leu Ser Ile Ser Asn
65              70                  75                  80

Ile Gln Pro Glu Asp Glu Ala Ile Tyr Ile Cys Gly Val Gly Asp Thr
                85                  90                  95

Ile Lys Glu Gln Phe Val Tyr Val Phe Gly Gly Gly Thr Lys Val Thr
                100                 105                 110

Val Leu Gly Ser Thr Ser Gly Ser Gly Lys Pro Gly Ser Gly Glu Gly
            115                 120                 125

Ser Thr Lys Gly Gln Val Gln Leu Lys Glu Ser Gly Pro Gly Leu Val
130                 135                 140

Ala Pro Ser Gln Ser Leu Ser Ile Thr Cys Thr Val Ser Gly Phe Ser
145                 150                 155                 160

Leu Thr Ser Tyr Ala Ile Ser Trp Val Arg Gln Pro Pro Gly Lys Gly
                165                 170                 175

Leu Glu Trp Leu Gly Val Ile Trp Thr Gly Gly Thr Asn Tyr Asn
            180                 185                 190

Ser Ala Leu Lys Ser Arg Leu Ser Ile Ser Lys Asp Asn Ser Lys Ser
            195                 200                 205

Gln Val Phe Leu Lys Met Asn Ser Leu Gln Thr Asp Asp Thr Ala Arg
            210                 215                 220

Tyr Tyr Cys Ala Arg Gly Gly Leu Arg Arg Gly Asp Tyr Phe Asp Tyr
225                 230                 235                 240
```

```
Trp Gly Gln Gly Thr Thr Leu Thr Val Ser Ser
            245                 250
```

```
<210> SEQ ID NO 7
<211> LENGTH: 293
<212> TYPE: PRT
<213> ORGANISM: Mus musculus

<400> SEQUENCE: 7
```

```
Gln Ala Val Val Thr Gln Glu Ser Ala Leu Thr Thr Ser Pro Gly Glu
1               5                   10                  15

Thr Val Thr Leu Thr Cys Arg Ser Ser Thr Gly Ala Val Thr Thr Ser
            20                  25                  30

Asn Tyr Ala Asn Trp Val Gln Glu Lys Pro Asp His Leu Phe Thr Gly
        35                  40                  45

Leu Ile Gly Gly Thr Asn Asn Arg Ala Pro Gly Val Pro Ala Arg Phe
    50                  55                  60

Ser Gly Ser Leu Ile Gly Asp Lys Ala Ala Leu Thr Ile Thr Gly Ala
65                  70                  75                  80

Gln Thr Glu Asp Glu Ala Ile Tyr Phe Cys Ala Leu Trp Tyr Ser Asn
                85                  90                  95

His Trp Val Phe Gly Gly Gly Thr Lys Leu Thr Val Leu Gly Ser Thr
            100                 105                 110

Ser Gly Ser Gly Lys Pro Gly Ser Gly Glu Gly Ser Thr Lys Gly Ile
        115                 120                 125

Cys Pro Met Ser Ser Pro Gln Ser Leu Lys Thr Arg Thr Leu Thr Met
    130                 135                 140

Gly Trp Asn Trp Ile Phe Ile Leu Ile Leu Ser Val Thr Thr Gly Val
145                 150                 155                 160

His Ser Glu Val Gln Leu Gln Ser Gly Pro Glu Leu Val Lys Pro
                165                 170                 175

Gly Ala Ser Val Lys Ile Ser Cys Lys Ala Ser Gly Tyr Ser Phe Thr
            180                 185                 190

Gly Tyr Tyr Met Asn Trp Val Asn Thr Thr Tyr Asn Gln Lys Phe Lys
        195                 200                 205

Ala Lys Ala Thr Leu Thr Val Asp Lys Ser Ser Ser Thr Ala Tyr Met
    210                 215                 220

Gln Leu Lys Ser Leu Thr Ser Glu Asp Ser Ala Val Tyr Tyr Cys Ala
225                 230                 235                 240

Arg Arg Arg Asp Phe Asp Tyr Trp Gly Gln Gly Thr Thr Leu Thr Val
                245                 250                 255

Ser Ser Ala Lys Thr Thr Pro Pro Ser Val Tyr Pro Leu Ala Pro Gly
            260                 265                 270

Ser Ala Ala Gln Thr Asn Ser Met Val Thr Leu Gly Cys Leu Val Lys
        275                 280                 285

Gly Tyr Phe Pro Glu
    290
```

```
<210> SEQ ID NO 8
<211> LENGTH: 246
<212> TYPE: PRT
<213> ORGANISM: Mus musculus

<400> SEQUENCE: 8
```

```
Gln Ala Val Val Thr Gln Glu Ser Ala Leu Thr Thr Ser Pro Gly Glu
1               5                   10                  15
```

```
Thr Val Thr Leu Thr Cys Arg Ser Ser Thr Gly Ala Val Thr Thr Ser
            20                  25                  30

Asn Tyr Ala Asn Trp Val Gln Glu Lys Pro Asp His Leu Phe Thr Gly
            35                  40                  45

Leu Ile Gly Gly Thr Asn Asn Arg Ala Pro Gly Val Pro Ala Arg Phe
 50                  55                  60

Ser Gly Ser Leu Ile Gly Asp Lys Ala Ala Leu Thr Ile Thr Gly Ala
 65                  70                  75                  80

Gln Thr Glu Asp Glu Ala Ile Tyr Phe Cys Ala Leu Trp Tyr Ser Asn
                85                  90                  95

His Trp Val Phe Gly Gly Gly Thr Lys Leu Thr Val Leu Gly Ser Thr
            100                 105                 110

Ser Gly Ser Gly Lys Pro Gly Ser Gly Glu Gly Ser Thr Lys Gly Gln
            115                 120                 125

Val Gln Leu Lys Glu Ser Gly Pro Gly Leu Val Ala Pro Ser Gln Ser
130                 135                 140

Leu Ser Ile Thr Cys Thr Val Ser Gly Phe Ser Leu Thr Ser Tyr Ala
145                 150                 155                 160

Ile Ser Trp Val Arg Gln Pro Pro Gly Lys Gly Leu Glu Trp Leu Gly
                165                 170                 175

Val Ile Trp Thr Gly Gly Gly Thr Asn Tyr Asn Ser Ala Leu Lys Ser
            180                 185                 190

Arg Leu Ser Ile Ser Lys Asp Asn Ser Lys Ser Gln Val Phe Leu Lys
            195                 200                 205

Met Asn Ser Leu Gln Thr Asp Asp Thr Ala Arg Tyr Tyr Cys Ala Arg
210                 215                 220

Gly Gly Leu Arg Arg Gly Asp Tyr Phe Asp Tyr Trp Gly Gln Gly Thr
225                 230                 235                 240

Thr Leu Thr Val Ser Ser
                245

<210> SEQ ID NO 9
<211> LENGTH: 166
<212> TYPE: PRT
<213> ORGANISM: Mus musculus

<400> SEQUENCE: 9

Ile Cys Pro Met Ser Ser Pro Gln Ser Leu Lys Thr Arg Thr Leu Thr
1               5                   10                  15

Met Gly Trp Asn Trp Ile Phe Ile Leu Ile Leu Ser Val Thr Thr Gly
            20                  25                  30

Val His Ser Glu Val Gln Leu Gln Gln Ser Gly Pro Glu Leu Val Lys
            35                  40                  45

Pro Gly Ala Ser Val Lys Ile Ser Cys Lys Ala Ser Gly Tyr Ser Phe
 50                  55                  60

Thr Gly Tyr Tyr Met Asn Trp Val Asn Thr Thr Tyr Asn Gln Lys Phe
 65                  70                  75                  80

Lys Ala Lys Ala Thr Leu Thr Val Asp Lys Ser Ser Ser Thr Ala Tyr
                85                  90                  95

Met Gln Leu Lys Ser Leu Thr Ser Glu Asp Ser Ala Val Tyr Tyr Cys
            100                 105                 110

Ala Arg Arg Arg Asp Phe Asp Tyr Trp Gly Gln Gly Thr Thr Leu Thr
            115                 120                 125

Val Ser Ser Ala Lys Thr Thr Pro Pro Ser Val Tyr Pro Leu Ala Pro
```

```
                130                 135                 140
Gly Ser Ala Ala Gln Thr Asn Ser Met Val Thr Leu Gly Cys Leu Val
145                 150                 155                 160

Lys Gly Tyr Phe Pro Glu
                165

<210> SEQ ID NO 10
<211> LENGTH: 119
<212> TYPE: PRT
<213> ORGANISM: Mus musculus

<400> SEQUENCE: 10

Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Leu Thr Ser Tyr
                20                  25                  30

Ala Ile Ser Trp Val Arg Gln Pro Pro Gly Lys Gly Leu Glu Trp Leu
                35                  40                  45

Gly Val Ile Trp Thr Gly Gly Thr Asn Tyr Asn Ser Ala Leu Lys
                50                  55                  60

Ser Arg Leu Ser Ile Ser Lys Asp Asn Ser Lys Ser Gln Val Phe Leu
65                  70                  75                  80

Lys Met Asn Ser Leu Gln Thr Asp Asp Thr Ala Arg Tyr Tyr Cys Ala
                85                  90                  95

Arg Gly Gly Leu Arg Arg Gly Asp Tyr Phe Asp Tyr Trp Gly Gln Gly
                100                 105                 110

Thr Thr Leu Thr Val Ser Ser
            115

<210> SEQ ID NO 11
<211> LENGTH: 111
<212> TYPE: PRT
<213> ORGANISM: Mus musculus

<400> SEQUENCE: 11

Asp Ile Val Leu Thr Gln Ser Pro Ala Ser Leu Ala Val Ser Leu Gly
1               5                   10                  15

Gln Arg Ala Thr Ile Ser Cys Arg Ala Ser Gln Ser Val Ser Thr Ser
                20                  25                  30

Ser Tyr Ser Tyr Met His Trp Tyr Gln Gln Lys Pro Gly Gln Pro Pro
                35                  40                  45

Lys Leu Leu Ile Lys Tyr Ala Ser Asn Leu Glu Ser Gly Val Pro Ala
                50                  55                  60

Arg Phe Ser Gly Ser Gly Ser Gly Thr Asp Phe Thr Leu Asn Ile His
65                  70                  75                  80

Pro Val Glu Glu Glu Asp Thr Ala Thr Tyr Tyr Cys Gln His Ser Trp
                85                  90                  95

Glu Ile Pro Tyr Thr Phe Gly Gly Gly Thr Lys Leu Glu Ile Lys
                100                 105                 110

<210> SEQ ID NO 12
<211> LENGTH: 133
<212> TYPE: PRT
<213> ORGANISM: Mus musculus

<400> SEQUENCE: 12

Met Arg Pro Ser Ile Gln Phe Leu Gly Leu Leu Leu Phe Trp Leu His
1               5                   10                  15
```

```
Gly Ala Gln Cys Asp Ile Gln Met Thr Gln Ser Pro Ser Ser Leu Ser
                20                  25                  30

Ala Ser Leu Gly Gly Lys Val Thr Ile Thr Cys Lys Ala Ser Gln Asp
            35                  40                  45

Ile Asn Lys Tyr Ile Ala Trp Tyr Gln His Lys Pro Gly Lys Gly Pro
 50                  55                  60

Arg Leu Leu Ile His Tyr Thr Ser Thr Leu Gln Pro Gly Ile Pro Ser
 65                  70                  75                  80

Arg Phe Ser Gly Ser Gly Ser Gly Arg Asp Tyr Ser Phe Ser Ile Ser
                 85                  90                  95

Asn Leu Glu Pro Glu Asp Ile Ala Thr Tyr Tyr Cys Leu Gln Tyr Asp
            100                 105                 110

Asn Leu Tyr Thr Phe Gly Gly Gly Thr Lys Leu Glu Ile Lys Gly Ser
        115                 120                 125

Thr Ser Gly Ser Gly
        130
```

<210> SEQ ID NO 13
<211> LENGTH: 114
<212> TYPE: PRT
<213> ORGANISM: Mus musculus

<400> SEQUENCE: 13

```
Gln Leu Val Leu Thr Gln Ser Ser Ala Ser Phe Ser Leu Gly Ala
 1               5                  10                  15

Ser Ala Lys Leu Thr Cys Thr Leu Ser Ser Gln His Ser Tyr Thr Ile
                20                  25                  30

Glu Trp Tyr Gln Gln Pro Leu Lys Pro Pro Lys Tyr Val Met Glu
            35                  40                  45

Leu Lys Lys Asp Gly Ser His Ser Thr Gly Asp Gly Ile Pro Asp Arg
 50                  55                  60

Phe Ser Gly Ser Ser Ser Gly Ala Asp Arg Tyr Leu Ser Ile Ser Asn
 65                  70                  75                  80

Ile Gln Pro Glu Asp Glu Ala Ile Tyr Ile Cys Gly Val Gly Asp Thr
                 85                  90                  95

Ile Lys Glu Gln Phe Val Tyr Val Phe Gly Gly Gly Thr Lys Val Thr
            100                 105                 110

Val Leu
```

<210> SEQ ID NO 14
<211> LENGTH: 109
<212> TYPE: PRT
<213> ORGANISM: Mus musculus

<400> SEQUENCE: 14

```
Gln Ala Val Val Thr Gln Glu Ser Ala Leu Thr Thr Ser Pro Gly Glu
 1               5                  10                  15

Thr Val Thr Leu Thr Cys Arg Ser Ser Thr Gly Ala Val Thr Thr Ser
                20                  25                  30

Asn Tyr Ala Asn Trp Val Gln Glu Lys Pro Asp His Leu Phe Thr Gly
            35                  40                  45

Leu Ile Gly Gly Thr Asn Asn Arg Ala Pro Gly Val Pro Ala Arg Phe
 50                  55                  60

Ser Gly Ser Leu Ile Gly Asp Lys Ala Ala Leu Thr Ile Thr Gly Ala
 65                  70                  75                  80
```

Gln Thr Glu Asp Glu Ala Ile Tyr Phe Cys Ala Leu Trp Tyr Ser Asn
            85                  90                  95

His Trp Val Phe Gly Gly Gly Thr Lys Leu Thr Val Leu
            100                 105

<210> SEQ ID NO 15
<211> LENGTH: 8
<212> TYPE: PRT
<213> ORGANISM: Mus musculus

<400> SEQUENCE: 15

Gly Tyr Ser Phe Thr Gly Tyr Tyr
1               5

<210> SEQ ID NO 16
<211> LENGTH: 10
<212> TYPE: PRT
<213> ORGANISM: Mus musculus

<400> SEQUENCE: 16

Cys Ala Arg Arg Arg Asp Phe Asp Tyr Trp
1               5                   10

<210> SEQ ID NO 17
<211> LENGTH: 8
<212> TYPE: PRT
<213> ORGANISM: Mus musculus

<400> SEQUENCE: 17

Gly Phe Ser Leu Thr Ser Tyr Ala
1               5

<210> SEQ ID NO 18
<211> LENGTH: 7
<212> TYPE: PRT
<213> ORGANISM: Mus musculus

<400> SEQUENCE: 18

Ile Trp Thr Gly Gly Gly Thr
1               5

<210> SEQ ID NO 19
<211> LENGTH: 15
<212> TYPE: PRT
<213> ORGANISM: Mus musculus

<400> SEQUENCE: 19

Cys Ala Arg Gly Gly Leu Arg Arg Gly Asp Tyr Phe Asp Tyr Trp
1               5                   10                  15

<210> SEQ ID NO 20
<211> LENGTH: 10
<212> TYPE: PRT
<213> ORGANISM: Mus musculus

<400> SEQUENCE: 20

Gln Ser Val Ser Thr Ser Ser Tyr Ser Tyr
1               5                   10

<210> SEQ ID NO 21
<211> LENGTH: 11
<212> TYPE: PRT
<213> ORGANISM: Mus musculus

<400> SEQUENCE: 21

Cys Gln His Ser Trp Glu Ile Pro Tyr Thr Phe
1               5                   10

<210> SEQ ID NO 22
<211> LENGTH: 6
<212> TYPE: PRT
<213> ORGANISM: Mus musculus

<400> SEQUENCE: 22

Gln Asp Ile Asn Lys Tyr
1               5

<210> SEQ ID NO 23
<211> LENGTH: 10
<212> TYPE: PRT
<213> ORGANISM: Mus musculus

<400> SEQUENCE: 23

Cys Leu Gln Tyr Asp Asn Leu Tyr Thr Phe
1               5                   10

<210> SEQ ID NO 24
<211> LENGTH: 6
<212> TYPE: PRT
<213> ORGANISM: Mus musculus

<400> SEQUENCE: 24

Ser Gln His Ser Tyr Thr
1               5

<210> SEQ ID NO 25
<211> LENGTH: 7
<212> TYPE: PRT
<213> ORGANISM: Mus musculus

<400> SEQUENCE: 25

Leu Lys Lys Asp Gly Ser His
1               5

<210> SEQ ID NO 26
<211> LENGTH: 15
<212> TYPE: PRT
<213> ORGANISM: Mus musculus

<400> SEQUENCE: 26

Cys Gly Val Gly Asp Thr Ile Lys Glu Gln Phe Val Tyr Val Phe
1               5                   10                  15

<210> SEQ ID NO 27
<211> LENGTH: 9
<212> TYPE: PRT
<213> ORGANISM: Mus musculus

<400> SEQUENCE: 27

Thr Gly Ala Val Thr Thr Ser Asn Tyr
1               5

<210> SEQ ID NO 28
<211> LENGTH: 11
<212> TYPE: PRT
<213> ORGANISM: Mus musculus

<400> SEQUENCE: 28

Cys Ala Leu Trp Tyr Ser Asn His Trp Val Phe

<210> SEQ ID NO 29
<211> LENGTH: 18
<212> TYPE: PRT
<213> ORGANISM: Artificial Sequence
<220> FEATURE:
<223> OTHER INFORMATION: Synthetic - Linker sequence

<400> SEQUENCE: 29

Gly Ser Thr Ser Gly Ser Gly Lys Pro Gly Ser Gly Glu Gly Ser Thr
1               5                   10                  15

Lys Gly

<210> SEQ ID NO 30
<211> LENGTH: 885
<212> TYPE: DNA
<213> ORGANISM: Mus musculus

<400> SEQUENCE: 30

```
gacattgtgc tgacacagtc tcctgcttcc ttagctgtat ctctggggca gagggccacc      60
atctcatgca gggccagcca aagtgtcagt acatctagct atagttatat gcactggtac     120
caacagaaac caggacagcc acccaaactc ctcatcaagt atgcatccaa cctagaatct     180
ggggtccctg ccaggttcag tggcagtggg tctgggacag acttcaccct caacatccat     240
cctgtggagg aggaggatac tgcaacatat tactgtcagc acagttggga gattccgtac     300
acgttcggag gggggaccaa gctggaaata aaaggctcca cctctggatc cggcaagccc     360
ggatctggcg agggatccac caagggcata tgtccaatgt cctctccaca atccctgaag     420
acacggactc taactatggg atggaactgg atctttattt taatcctgtc agtaactaca     480
ggtgtccact ctgaggtcca gctgcagcag tctggacctg agctggtgaa gcctggggct     540
tcagtgaaga tatcctgcaa ggcttctggt tactcattca ctggctacta catgaactgg     600
gtgaatacta cctacaacca gaagttcaag gccaaggcca cattgactgt agacaaatcc     660
tccagcacag cctacatgca gctcaagagc ctgacatctg aggactctgc agtctattac     720
tgtgcaagac ggagggactt tgactactgg ggccaaggca ccactctcac agtctcctca     780
gccaaaacga cacccccatc tgtctatcca ctggcccctg gatctgctgc ccaaactaac     840
tccatggtga ccctgggatg cctggtcaag ggctatttcc ctgag                     885
```

<210> SEQ ID NO 31
<211> LENGTH: 744
<212> TYPE: DNA
<213> ORGANISM: Mus musculus

<400> SEQUENCE: 31

```
gacattgtgc tgacacagtc tcctgcttcc ttagctgtat ctctggggca gagggccacc      60
atctcatgca gggccagcca aagtgtcagt acatctagct atagttatat gcactggtac     120
caacagaaac caggacagcc acccaaactc ctcatcaagt atgcatccaa cctagaatct     180
ggggtccctg ccaggttcag tggcagtggg tctgggacag acttcaccct caacatccat     240
cctgtggagg aggaggatac tgcaacatat tactgtcagc acagttggga gattccgtac     300
acgttcggag gggggaccaa gctggaaata aaaggctcca cctctggatc cggcaagccc     360
ggatctggcg agggatccac caagggccag gtgcagctga aggagtcagg acctggcctg     420
gtggcgccct cacagagcct gtccatcaca tgcactgtct ctgggttctc attaaccagc     480
```

| | |
|---|---|
| tatgctataa gctgggttcg ccagccacca ggaaagggtc tggagtggct tggagtaata | 540 |
| tggactggtg gaggcacaaa ttataattca gctctcaaat ccagactgag catcagcaaa | 600 |
| gacaactcca agagtcaagt tttcttaaaa atgaacagtc tgcaaactga tgacacagcc | 660 |
| aggtactact gtgccagagg gggattacga cggggggact actttgacta ctggggccaa | 720 |
| ggcaccactc tcacagtctc ctca | 744 |

<210> SEQ ID NO 32
<211> LENGTH: 930
<212> TYPE: DNA
<213> ORGANISM: Mus musculus

<400> SEQUENCE: 32

| | |
|---|---|
| atgagaccgt ctattcagtt cctggggctc ttgttgttct ggcttcatgg tgctcagtgt | 60 |
| gacatccaga tgacacagtc tccatcctca ctgtctgcat ctctgggagg caaagtcacc | 120 |
| atcacttgca aggcaagcca agacattaac aagtatatag cttggtacca acacaagcct | 180 |
| ggaaaaggtc ctaggctgct catacattac acatctacat tacagccagg catcccatca | 240 |
| aggttcagtg gaagtgggtc tgggagagat tattccttca gcatcagcaa cctggagcct | 300 |
| gaagatattg caacttatta ttgtctacag tatgataatc tgtacacgtt cggaggggggg | 360 |
| accaagctgg aaataaaagg ctccacctct ggatccggca agcccggatc tgcgagggga | 420 |
| tccaccaagg gcatatgtcc aatgtcctct ccacaatccc tgaagacacg gactctaact | 480 |
| atgggatgga actggatctt tattttaatc ctgtcagtaa ctacaggtgt ccactctgag | 540 |
| gtccagctgc agcagtctgg acctgagctg gtgaagcctg ggcttcagt gaagatatcc | 600 |
| tgcaaggctt ctggttactc attcactggc tactacatga actgggtgaa atactaccta | 660 |
| aaccagaagt tcaaggccaa ggccacattg actgtagaca aatcctccag cacagcctac | 720 |
| atgcagctca gagcctgaca tctgaggac tctgcagtct attactgtgc aagacggagg | 780 |
| gactttgact actgggggcca aggcaccact ctcacagtcc ctcagccaa aacgacaccc | 840 |
| ccatctgtct atccactggc ccctggatct gctgcccaaa ctaactccat ggtgaccctg | 900 |
| ggatgcctgg tcaagggcta tttccctgag | 930 |

<210> SEQ ID NO 33
<211> LENGTH: 789
<212> TYPE: DNA
<213> ORGANISM: Mus musculus

<400> SEQUENCE: 33

| | |
|---|---|
| atgagaccgt ctattcagtt cctggggctc ttgttgttct ggcttcatgg tgctcagtgt | 60 |
| gacatccaga tgacacagtc tccatcctca ctgtctgcat ctctgggagg caaagtcacc | 120 |
| atcacttgca aggcaagcca agacattaac aagtatatag cttggtacca acacaagcct | 180 |
| ggaaaaggtc ctaggctgct catacattac acatctacat tacagccagg catcccatca | 240 |
| aggttcagtg gaagtgggtc tgggagagat tattccttca gcatcagcaa cctggagcct | 300 |
| gaagatattg caacttatta ttgtctacag tatgataatc tgtacacgtt cggaggggggg | 360 |
| accaagctgg aaataaaagg ctccacctct ggatccggca agcccggatc tgcgagggga | 420 |
| tccaccaagg gccaggtgca gctgaaggag tcaggacctg gcctggtggc gcctcacag | 480 |
| agcctgtcca tcacatgcac tgtctctggg ttctcattaa ccagctatgc tataagctgg | 540 |
| gttcgccagc caccaggaaa gggtctggag tggcttggaa taatatggac tggtggaggc | 600 |
| acaaattata attcagctct caaatccaga ctgagcatca gcaaagacaa ctccaagagt | 660 |

```
caagttttct taaaaatgaa cagtctgcaa actgatgaca cagccaggta ctactgtgcc      720 agaggggat  tacgacgggg ggactacttt gactactggg gccaaggcac cactctcaca      780
gtctcctca                                                              789
```

<210> SEQ ID NO 34
<211> LENGTH: 894
<212> TYPE: DNA
<213> ORGANISM: Mus musculus

<400> SEQUENCE: 34

```
caacttgtgc tcactcagtc atcttcagcc tctttctccc tgggagcctc agcaaaactc       60
acgtgcacct tgagtagtca gcacagttac accattgaat ggtatcagca acagccactc      120
aagcctccta agtatgtgat ggagcttaag aaagatggaa gccacagcac aggtgatggg      180
attcctgatc gcttctctgg atccagctct ggtgctgatc gctaccttag catttccaac      240
atccagcctg aagatgaagc aatatacatc tgtggtgtgg gtgatacaat taaggaacaa      300
tttgtgtatg ttttcggcgg tggaaccaag gtcactgtcc taggctccac ctctggatcc      360
ggcaagcccg gatctggcga gggatccacc aagggcatat gtccaatgtc ctctccacaa      420
tccctgaaga cacggactct aactatggga tggaactgga tctttatttt aatcctgtca      480
gtaactacag gtgtccactc tgaggtccag ctgcagcagt ctggacctga gctggtgaag      540
cctggggctt cagtgaagat atcctgcaag gcttctggtt actcattcac tggctactac      600
atgaactggg tgaatactac ctacaaccag aagttcaagg ccaaggccac attgactgta      660
gacaaatcct ccagcacagc ctacatgcag ctcaagagcc tgacatctga ggactctgca      720
gtctattact gtgcaagacg gagggacttt gactactggg gccaaggcac cactctcaca      780
gtctcctcag ccaaaacgac accccatct gtctatccac tggcccctgg atctgctgcc       840
caaactaact ccatggtgac cctgggatgc ctggtcaagg gctatttccc tgag           894
```

<210> SEQ ID NO 35
<211> LENGTH: 753
<212> TYPE: DNA
<213> ORGANISM: Mus musculus

<400> SEQUENCE: 35

```
caacttgtgc tcactcagtc atcttcagcc tctttctccc tgggagcctc agcaaaactc       60
acgtgcacct tgagtagtca gcacagttac accattgaat ggtatcagca acagccactc      120
aagcctccta agtatgtgat ggagcttaag aaagatggaa gccacagcac aggtgatggg      180
attcctgatc gcttctctgg atccagctct ggtgctgatc gctaccttag catttccaac      240
atccagcctg aagatgaagc aatatacatc tgtggtgtgg gtgatacaat taaggaacaa      300
tttgtgtatg ttttcggcgg tggaaccaag gtcactgtcc taggctccac ctctggatcc      360
ggcaagcccg gatctggcga gggatccacc aagggccagg tgcagctgaa ggagtcagga      420
cctggcctgg tggcgccctc acagagcctg tccatcacat gcactgtctc tgggttctca      480
ttaaccagct atgctataag ctgggttcgc cagccaccag aaagggtct  ggagtggctt      540 ggagtaatat ggactggtgg aggcacaaat tataattcag ctctcaaatc cagactgagc      600
atcagcaaag acaactccaa gagtcaagtt ttcttaaaaa tgaacagtct gcaaactgat      660
gacacagcca ggtactactg tgccagaggg ggattacgac ggggggacta ctttgactac      720
tggggccaag gcaccactct cacagtctcc tca                                   753
```

-continued

```
<210> SEQ ID NO 36
<211> LENGTH: 879
<212> TYPE: DNA
<213> ORGANISM: Mus musculus

<400> SEQUENCE: 36
caggctgttg tgactcagga atctgcactc accacatcac ctggtgaaac agtcacactc    60
acttgtcgct caagtactgg ggctgttaca actagtaact atgccaactg ggtccaagaa   120
aaaccagatc atttattcac tggtctaata ggtggtacca acaaccgagc tccaggtgtt   180
cctgccagat tctcaggctc cctgattgga gacaaggctg ccctcaccat cacagggcca   240
cagactgagg atgaggcaat atatttctgt gctctatggt acagcaacca ttgggtgttc   300
ggtggaggaa ccaaactgac tgtcctaggc tccacctctg gatccggcaa gcccggatct   360
ggcgagggat ccaccaaggg catatgtcca atgtcctctc acaatccct gaagacacgg    420 actctaacta tgggatggaa ctggatcttt attttaatcc tgtcagtaac tacaggtgtc   480
cactctgagg tccagctgca gcagtctgga cctgagctgg tgaagcctgg gcttcagtg    540 aagatatcct gcaaggcttc tggttactca ttcactggct actacatgaa ctgggtgaat   600
actacctaca accagaagtt caaggccaag gccacattga ctgtagacaa atcctccagc   660
acagcctaca tgcagctcaa gagcctgaca tctgaggact ctgcagtcta ttactgtgca   720
agacggaggg actttgacta ctggggccaa ggcaccactc tcacagtctc ctcagccaaa   780
acgacacccc catctgtcta tccactggcc cctggatctg ctgcccaaac taactccatg   840
gtgaccctgg gatgcctggt caagggctat ttccctgag                          879

<210> SEQ ID NO 37
<211> LENGTH: 738
<212> TYPE: DNA
<213> ORGANISM: Mus musculus

<400> SEQUENCE: 37
caggctgttg tgactcagga atctgcactc accacatcac ctggtgaaac agtcacactc    60
acttgtcgct caagtactgg ggctgttaca actagtaact atgccaactg ggtccaagaa   120
aaaccagatc atttattcac tggtctaata ggtggtacca acaaccgagc tccaggtgtt   180
cctgccagat tctcaggctc cctgattgga gacaaggctg ccctcaccat cacagggcca   240
cagactgagg atgaggcaat atatttctgt gctctatggt acagcaacca ttgggtgttc   300
ggtggaggaa ccaaactgac tgtcctaggc tccacctctg gatccggcaa gcccggatct   360
ggcgagggat ccaccaaggg ccaggtgcag ctgaaggagt caggacctgg cctggtggcg   420
ccctcacaga gcctgtccat cacatgcact gtctctgggt tctcattaac cagctatgct   480
ataagctggg ttcgccagcc accaggaaag ggtctggagt ggcttggagt aatatggact   540 ggtgaggca caaattataa ttcagctctc aaatccagac tgagcatcag caaagacaac   600
tccaagagtc aagttttctt aaaaatgaac agtctgcaaa ctgatgacac agccaggtac   660
tactgtgcca gaggggatt acgacggggg gactactttg actactgggg ccaaggcacc   720
actctcacag tctcctca                                                  738
```